United States Patent
Crouse et al.

(10) Patent No.: US 10,846,650 B1
(45) Date of Patent: Nov. 24, 2020

(54) PERPETUAL VALUE BEARING SHIPPING LABELS

(75) Inventors: Jeffery T. Crouse, Santa Monica, CA (US); Michael John Biswas, Culver City, CA (US); Christopher Andrew Gaudet, Playa Del Rey, CA (US)

(73) Assignee: Stamps.com Inc., El Segundo, CA (US)

( * ) Notice: Subject to any disclaimer, the term of this patent is extended or adjusted under 35 U.S.C. 154(b) by 1183 days.

(21) Appl. No.: 13/286,854

(22) Filed: Nov. 1, 2011

(51) Int. Cl.
*G06Q 10/08* (2012.01)

(52) U.S. Cl.
CPC .............................. *G06Q 10/0838* (2013.01)

(58) Field of Classification Search
USPC .......................................................... 705/64
See application file for complete search history.

(56) References Cited

U.S. PATENT DOCUMENTS

| | | |
|---|---|---|
| 1,684,756 A | 9/1928 | Close |
| 1,988,908 A | 1/1935 | MacKinnon |
| 2,825,498 A | 3/1958 | Alves |
| 2,887,326 A | 5/1959 | Kramer |
| 2,964,232 A | 12/1960 | Levyn |
| 3,111,084 A | 11/1963 | Ridenour et al. |
| 3,221,980 A | 12/1965 | Mercur |
| 3,380,648 A | 4/1968 | De Lyra |
| 3,584,696 A | 6/1971 | Eblowitz |
| 3,594,727 A | 7/1971 | Braun |
| 3,658,239 A | 4/1972 | Foutz |
| 3,691,726 A | 9/1972 | Stephens et al. |
| 3,747,837 A | 7/1973 | Wilson |
| 3,938,095 A | 2/1976 | Check, Jr. et al. |
| 3,978,457 A | 8/1976 | Check, Jr. et al. |

(Continued)

FOREIGN PATENT DOCUMENTS

| | | |
|---|---|---|
| DE | 4409386 A1 | 9/1995 |
| EP | 0137737 A2 | 4/1985 |

(Continued)

OTHER PUBLICATIONS

U.S. Appl. No. 12/030,739, McBride et al.
(Continued)

*Primary Examiner* — Zeshan Qayyum
(74) *Attorney, Agent, or Firm* — Norton Rose Fulbright US LLP

(57) ABSTRACT

Systems and methods which facilitate fixed rate shipping through the use of perpetual value bearing shipping labels are disclosed. The substantially perpetual viability of the value borne by perpetual value bearing shipping labels herein provides a shelf life which exceeds a shipping rate change epoch. Perpetual value bearing shipping labels of embodiments, although providing valid viable postage for use in obtaining shipping services, are provided as fungible products and do not include delivery or date information as pre-produced and made available to shippers in advance of their shipping activity. An on-line fulfillment system may be provided in which shippers may select a desired number of perpetual value bearing shipping labels in one or more value bearing amount for purchase by and delivery to the shipper for later use. Perpetual value bearing shipping labels may also be made available to shippers is through point of sale acquisition.

16 Claims, 3 Drawing Sheets

(56) References Cited

U.S. PATENT DOCUMENTS

| | | |
|---|---|---|
| 4,119,194 A | 10/1978 | Freeman et al. |
| 4,201,339 A | 5/1980 | Gunn |
| 4,245,775 A | 1/1981 | Conn |
| 4,253,158 A | 2/1981 | McFiggans |
| 4,271,481 A | 6/1981 | Check, Jr. et al. |
| 4,306,299 A | 12/1981 | Check, Jr. et al. |
| 4,376,299 A | 3/1983 | Rivest |
| 4,511,793 A | 4/1985 | Racanelli |
| 4,565,317 A | 1/1986 | Kranz |
| 4,629,871 A | 12/1986 | Scribner et al. |
| 4,641,347 A | 2/1987 | Clark et al. |
| 4,649,266 A | 3/1987 | Eckert |
| 4,661,001 A | 4/1987 | Takai et al. |
| 4,709,850 A | 12/1987 | Wagner |
| 4,725,718 A | 2/1988 | Sansone et al. |
| 4,743,747 A | 5/1988 | Fougere et al. |
| 4,744,554 A | 5/1988 | Kulpa et al. |
| 4,757,537 A | 7/1988 | Edelmann et al. |
| 4,760,532 A | 7/1988 | Sansone et al. |
| 4,763,271 A | 8/1988 | Field |
| 4,775,246 A | 10/1988 | Edelmann et al. |
| 4,784,317 A | 11/1988 | Chen et al. |
| 4,800,506 A | 1/1989 | Axelrod et al. |
| 4,802,218 A | 1/1989 | Wright et al. |
| 4,812,994 A | 3/1989 | Taylor et al. |
| 4,821,195 A | 4/1989 | Baer et al. |
| 4,831,554 A | 5/1989 | Storace et al. |
| 4,831,555 A | 5/1989 | Sansone et al. |
| 4,837,701 A | 6/1989 | Sansone et al. |
| 4,853,865 A | 8/1989 | Sansone et al. |
| 4,858,138 A | 8/1989 | Talmadge |
| 4,862,386 A | 8/1989 | Axelrod et al. |
| 4,864,618 A | 9/1989 | Wright et al. |
| 4,868,757 A | 9/1989 | Gil |
| 4,872,705 A | 10/1989 | Hartfeil |
| 4,872,706 A | 10/1989 | Brewen et al. |
| 4,873,645 A | 10/1989 | Hunter et al. |
| 4,875,174 A | 10/1989 | Olodort et al. |
| 4,893,249 A | 1/1990 | Silverberg |
| 4,900,903 A | 2/1990 | Wright et al. |
| 4,900,904 A | 2/1990 | Wright et al. |
| 4,900,941 A | 2/1990 | Barton et al. |
| 4,901,241 A | 2/1990 | Schneck |
| 4,908,770 A | 3/1990 | Breault et al. |
| 4,910,686 A | 3/1990 | Chang et al. |
| 4,919,325 A | 4/1990 | Culver |
| 4,933,849 A | 6/1990 | Connell et al. |
| 4,934,846 A | 6/1990 | Gilham |
| 4,941,091 A | 7/1990 | Breault et al. |
| 4,947,333 A | 8/1990 | Sansone et al. |
| 4,993,752 A | 2/1991 | Juszak |
| 4,998,204 A | 3/1991 | Sansone et al. |
| 5,025,141 A | 6/1991 | Bolan |
| 5,044,669 A | 9/1991 | Berry |
| 5,058,008 A | 10/1991 | Schumacher |
| 5,065,000 A | 11/1991 | Pusic |
| 5,067,088 A | 11/1991 | Schneiderhan |
| 5,075,862 A | 12/1991 | Doeberl et al. |
| 5,077,792 A | 12/1991 | Herring |
| 5,085,470 A | 2/1992 | Peach et al. |
| 5,091,771 A | 2/1992 | Bolan et al. |
| 5,111,030 A | 5/1992 | Brasington et al. |
| 5,119,306 A | 6/1992 | Metelits et al. |
| 5,136,647 A | 8/1992 | Haber et al. |
| 5,150,407 A | 9/1992 | Chan |
| 5,200,903 A | 4/1993 | Gilham et al. |
| 5,202,834 A | 4/1993 | Gilham |
| 5,233,657 A | 8/1993 | Gunther |
| 5,237,506 A | 8/1993 | Horbal et al. |
| 5,239,168 A | 8/1993 | Durst, Jr. et al. |
| 5,289,540 A | 2/1994 | Jones |
| 5,316,208 A | 5/1994 | Petkovsek |
| 5,319,562 A | 6/1994 | Whitehouse |
| 5,323,323 A | 6/1994 | Gilham |
| 5,323,465 A | 6/1994 | Avarne |
| 5,341,505 A | 8/1994 | Whitehouse |
| 5,360,628 A | 11/1994 | Butland |
| 5,375,172 A | 12/1994 | Chrosny |
| 5,384,886 A | 1/1995 | Rourke |
| 5,388,049 A | 2/1995 | Sansone et al. |
| 5,390,849 A | 2/1995 | Frissard |
| 5,410,642 A | 4/1995 | Hakamatsuka et al. |
| 5,423,573 A | 6/1995 | de Passille |
| 5,425,586 A | 6/1995 | Berson |
| 5,437,441 A | 8/1995 | Tuhro et al. |
| 5,439,721 A | 8/1995 | Pedroli et al. |
| 5,449,200 A | 9/1995 | Andric et al. |
| 5,454,038 A | 9/1995 | Cordery et al. |
| 5,471,925 A | 12/1995 | Heinrich et al. |
| 5,476,420 A | 12/1995 | Manning |
| 5,490,077 A | 2/1996 | Freytag |
| 5,494,445 A | 2/1996 | Sekiguchi et al. |
| 5,501,393 A | 3/1996 | Walz |
| 5,502,304 A | 3/1996 | Berson et al. |
| 5,510,992 A | 4/1996 | Kara |
| 5,524,995 A | 6/1996 | Brookner et al. |
| 5,554,842 A | 9/1996 | Connell et al. |
| 5,569,317 A | 10/1996 | Sarada et al. |
| 5,573,277 A | 11/1996 | Petkovsek |
| 5,583,779 A | 12/1996 | Naclerio et al. |
| 5,598,970 A | 2/1997 | Mudry et al. |
| 5,600,562 A | 2/1997 | Guenther |
| 5,601,313 A | 2/1997 | Konkol et al. |
| 5,602,743 A | 2/1997 | Fraytag |
| 5,606,507 A | 2/1997 | Kara |
| 5,606,613 A | 2/1997 | Lee et al. |
| 5,612,541 A | 3/1997 | Hoffmann et al. |
| 5,612,889 A | 3/1997 | Pintsov et al. |
| 5,615,123 A | 3/1997 | Davidson et al. |
| 5,615,312 A | 3/1997 | Kohler |
| 5,617,519 A | 4/1997 | Herbert |
| 5,619,571 A | 4/1997 | Sandstrom et al. |
| 5,623,546 A | 4/1997 | Hardy et al. |
| 5,635,694 A | 6/1997 | Tuhro |
| 5,649,118 A | 7/1997 | Carlisle et al. |
| 5,650,934 A | 7/1997 | Manduley |
| 5,651,238 A | 7/1997 | Belec et al. |
| 5,655,023 A | 8/1997 | Cordery et al. |
| 5,666,215 A | 9/1997 | Fredlund et al. |
| 5,666,284 A | 9/1997 | Kara |
| 5,682,318 A | 10/1997 | Kara |
| 5,696,829 A | 12/1997 | Cordery et al. |
| 5,706,502 A | 1/1998 | Foley et al. |
| 5,708,422 A | 1/1998 | Blonder et al. |
| 5,715,314 A | 2/1998 | Payne et al. |
| 5,717,596 A | 2/1998 | Bernard et al. |
| 5,717,597 A | 2/1998 | Kara |
| 5,717,980 A | 2/1998 | Oka et al. |
| 5,729,460 A | 3/1998 | Plett et al. |
| 5,737,729 A | 4/1998 | Denman |
| 5,742,683 A | 4/1998 | Lee et al. |
| 5,768,132 A | 6/1998 | Cordery et al. |
| 5,774,886 A | 6/1998 | Kara |
| 5,778,076 A | 7/1998 | Kara et al. |
| 5,791,553 A | 8/1998 | Fabel |
| 5,796,834 A | 8/1998 | Whitney et al. |
| 5,801,364 A | 9/1998 | Kara et al. |
| 5,801,944 A | 9/1998 | Kara |
| 5,805,810 A | 9/1998 | Maxwell |
| 5,812,991 A | 9/1998 | Kara |
| 5,819,240 A | 10/1998 | Kara |
| 5,822,739 A | 10/1998 | Kara |
| 5,825,893 A | 10/1998 | Kara |
| 5,836,617 A | 11/1998 | Beaudoin et al. |
| 5,860,068 A | 1/1999 | Cook |
| 5,884,277 A | 3/1999 | Khosla |
| 5,902,439 A | 5/1999 | Pike et al. |
| 5,923,406 A | 7/1999 | Brasington et al. |
| 5,923,885 A | 7/1999 | Johnson et al. |
| 5,924,738 A | 7/1999 | Konkol et al. |
| 5,929,415 A | 7/1999 | Berson |
| 5,932,139 A | 8/1999 | Oshima et al. |
| 5,936,865 A | 8/1999 | Pintsov et al. |
| 5,936,885 A | 8/1999 | Morita et al. |

(56) References Cited

U.S. PATENT DOCUMENTS

| | | |
|---|---|---|
| 5,946,671 A | 8/1999 | Herring |
| 5,950,916 A | 9/1999 | Santangelo |
| 5,960,418 A | 9/1999 | Kelly et al. |
| 5,983,209 A | 11/1999 | Kara |
| 5,995,985 A | 11/1999 | Cai |
| 6,005,945 A | 12/1999 | Whitehouse |
| 6,010,069 A | 1/2000 | Debois |
| 6,010,156 A * | 1/2000 | Block .............. G07B 17/00508 281/2 |
| 6,026,385 A | 2/2000 | Harvey et al. |
| 6,033,751 A | 3/2000 | Kline |
| 6,061,670 A | 5/2000 | Brand |
| D434,438 S | 11/2000 | Kara |
| 6,142,380 A | 11/2000 | Sansone et al. |
| 6,155,476 A | 12/2000 | Fabel |
| 6,173,888 B1 | 1/2001 | Fabel |
| 6,175,826 B1 | 1/2001 | Malandra, Jr. et al. |
| 6,181,433 B1 | 1/2001 | Hayama et al. |
| 6,184,534 B1 | 2/2001 | Stephany et al. |
| 6,199,055 B1 | 3/2001 | Kara et al. |
| 6,208,980 B1 | 3/2001 | Kara |
| 6,209,779 B1 | 4/2001 | Fabel |
| 6,233,565 B1 | 5/2001 | Lewis et al. |
| 6,234,694 B1 | 5/2001 | Brookner |
| 6,244,763 B1 | 6/2001 | Miller |
| 6,249,777 B1 | 6/2001 | Kara et al. |
| 6,296,404 B1 | 10/2001 | Pierce et al. |
| 6,311,240 B1 | 10/2001 | Boone et al. |
| 6,322,192 B1 | 11/2001 | Walker |
| 6,370,844 B1 | 4/2002 | Stricker |
| 6,385,504 B1 | 5/2002 | Pintsov et al. |
| 6,397,328 B1 | 5/2002 | Pitchenik et al. |
| 6,415,983 B1 | 7/2002 | Ulvr et al. |
| 6,427,021 B1 | 7/2002 | Fischer et al. |
| 6,428,219 B1 | 8/2002 | Stier et al. |
| 6,430,543 B1 | 8/2002 | Lee et al. |
| 6,438,530 B1 | 8/2002 | Heiden et al. |
| 6,461,063 B1 | 10/2002 | Miller et al. |
| 6,505,179 B1 | 1/2003 | Kara |
| 6,505,980 B1 | 1/2003 | Allday |
| 6,523,014 B1 | 2/2003 | Pauschinger |
| 6,526,391 B1 | 2/2003 | Cordery et al. |
| 6,532,452 B1 | 3/2003 | Pintsov et al. |
| 6,594,374 B1 | 7/2003 | Beckstrom et al. |
| 6,595,412 B2 | 7/2003 | Manduley |
| 6,655,579 B1 | 12/2003 | Delman et al. |
| 6,671,813 B2 | 12/2003 | Ananda |
| 6,692,031 B2 | 2/2004 | McGrew |
| 6,697,822 B1 | 2/2004 | Armatis et al. |
| 6,701,304 B2 | 3/2004 | Leon |
| 6,722,563 B1 | 4/2004 | Johnson et al. |
| 6,735,575 B1 | 5/2004 | Kara |
| 6,820,201 B1 | 11/2004 | Lincoln et al. |
| 6,834,112 B1 | 12/2004 | Brickell |
| 6,834,273 B1 | 12/2004 | Sansone et al. |
| 6,853,990 B1 | 2/2005 | Thiel |
| 6,868,406 B1 | 3/2005 | Ogg et al. |
| 6,902,265 B2 | 6/2005 | Critelli et al. |
| 6,904,168 B1 | 6/2005 | Steinberg et al. |
| 6,946,960 B2 | 9/2005 | Sisson et al. |
| 6,948,660 B2 | 9/2005 | Critelli et al. |
| 7,028,902 B2 | 4/2006 | Xu et al. |
| 7,039,214 B2 | 5/2006 | Miller et al. |
| 7,069,253 B2 | 6/2006 | Leon |
| 7,085,725 B1 | 8/2006 | Leon |
| 7,117,363 B2 | 10/2006 | Lincoln et al. |
| 7,127,434 B2 | 10/2006 | Burningham |
| 7,149,726 B1 | 12/2006 | Lingle et al. |
| 7,162,460 B2 | 1/2007 | Cleckler et al. |
| 7,182,259 B2 | 2/2007 | Lubow et al. |
| 7,191,158 B2 | 3/2007 | Ogg |
| 7,191,336 B2 | 3/2007 | Zeller et al. |
| 7,194,957 B1 | 3/2007 | Leon et al. |
| 7,201,305 B1 | 4/2007 | Correa |
| 7,222,236 B1 | 5/2007 | Pagel |
| 7,225,170 B1 * | 5/2007 | Ryan, Jr. ............ G07B 17/0008 705/401 |
| 7,233,929 B1 | 6/2007 | Lingle et al. |
| 7,234,645 B2 | 6/2007 | Silverbrook et al. |
| 7,243,842 B1 | 7/2007 | Leon et al. |
| 7,266,531 B2 | 9/2007 | Pintsov et al. |
| 7,305,556 B2 | 12/2007 | Slick et al. |
| 7,337,152 B1 | 2/2008 | Gawler |
| 7,343,357 B1 | 3/2008 | Kara |
| 7,396,048 B2 | 7/2008 | Janetzke et al. |
| 7,418,599 B2 | 8/2008 | Peters |
| 7,458,612 B1 | 12/2008 | Bennett |
| 7,509,291 B2 | 3/2009 | McBride et al. |
| 7,548,612 B2 | 6/2009 | Weissman et al. |
| 7,577,618 B2 | 8/2009 | Raju et al. |
| 7,711,650 B1 | 5/2010 | Kara |
| 7,778,924 B1 * | 8/2010 | Ananda .............. G07B 17/0008 705/50 |
| 7,784,090 B2 | 8/2010 | Lord et al. |
| 7,828,223 B1 | 11/2010 | Leon et al. |
| 7,831,518 B2 | 11/2010 | Montgomery et al. |
| 7,831,524 B2 | 11/2010 | Whitehouse |
| 7,831,824 B2 | 11/2010 | Abdulhayoglu |
| 7,840,492 B2 | 11/2010 | Leung et al. |
| 7,954,709 B1 | 6/2011 | Leon et al. |
| 7,963,437 B1 | 6/2011 | McBride et al. |
| 8,100,324 B1 | 1/2012 | Leon |
| 8,155,976 B1 | 4/2012 | Rendich et al. |
| 8,204,835 B1 | 6/2012 | Ogg |
| 8,240,579 B1 | 8/2012 | Bennett |
| 8,285,651 B1 | 10/2012 | Leon et al. |
| 8,612,361 B1 | 12/2013 | Bussell et al. |
| 8,626,673 B1 | 1/2014 | Bennett |
| 8,775,331 B1 | 7/2014 | Tsuie et al. |
| 9,208,620 B1 | 12/2015 | Bortnak et al. |
| 9,911,246 B1 | 3/2018 | McBride et al. |
| 9,978,185 B1 | 5/2018 | Bortnak et al. |
| 10,373,398 B1 | 8/2019 | McBride et al. |
| 2001/0007086 A1 | 7/2001 | Rogers et al. |
| 2001/0020234 A1 | 9/2001 | Shah et al. |
| 2001/0022060 A1 | 9/2001 | Robertson et al. |
| 2001/0032881 A1 | 10/2001 | Wells et al. |
| 2001/0042052 A1 | 11/2001 | Leon |
| 2001/0054153 A1 | 12/2001 | Wheeler et al. |
| 2002/0023057 A1 | 2/2002 | Goodwin et al. |
| 2002/0032668 A1 | 3/2002 | Kohler et al. |
| 2002/0032784 A1 | 3/2002 | Darago et al. |
| 2002/0033598 A1 | 3/2002 | Beasley |
| 2002/0046195 A1 | 4/2002 | Martin et al. |
| 2002/0052841 A1 | 5/2002 | Guthrie et al. |
| 2002/0070149 A1 | 6/2002 | Schererz et al. |
| 2002/0073039 A1 | 6/2002 | Ogg et al. |
| 2002/0073050 A1 | 6/2002 | Gusler et al. |
| 2002/0082935 A1 | 6/2002 | Moore et al. |
| 2002/0083020 A1 | 6/2002 | Leon |
| 2002/0083021 A1 | 6/2002 | Ryan et al. |
| 2002/0099652 A1 | 7/2002 | Herzen et al. |
| 2002/0143431 A1 | 10/2002 | Sansone |
| 2002/0149195 A1 | 10/2002 | Beasley |
| 2002/0190117 A1 | 12/2002 | Manduley |
| 2003/0002709 A1 | 1/2003 | Wu |
| 2003/0029914 A1 | 2/2003 | Hortman et al. |
| 2003/0030270 A1 | 2/2003 | Franko et al. |
| 2003/0037008 A1 | 2/2003 | Raju et al. |
| 2003/0059635 A1 | 3/2003 | Naasani |
| 2003/0078893 A1 | 4/2003 | Shah et al. |
| 2003/0080182 A1 | 5/2003 | Gunther |
| 2003/0088426 A1 | 5/2003 | Benson et al. |
| 2003/0101143 A1 | 5/2003 | Montgomery et al. |
| 2003/0101147 A1 | 5/2003 | Montgomery et al. |
| 2003/0101148 A1 | 5/2003 | Montgomery et al. |
| 2003/0115162 A1 | 6/2003 | Konick |
| 2003/0138345 A1 | 7/2003 | Schwabe |
| 2003/0140017 A1 | 7/2003 | Patton et al. |
| 2003/0144972 A1 | 7/2003 | Cordery et al. |
| 2003/0167241 A1 | 9/2003 | Gilham |
| 2003/0182155 A1 | 9/2003 | Nitzan et al. |
| 2003/0187666 A1 | 10/2003 | Leon |
| 2003/0204477 A1 | 10/2003 | McNett |

(56) References Cited

U.S. PATENT DOCUMENTS

| | | |
|---|---|---|
| 2003/0233276 A1 | 12/2003 | Pearlman et al. |
| 2003/0236709 A1 | 12/2003 | Hendra et al. |
| 2004/0000787 A1 | 1/2004 | Vig et al. |
| 2004/0002926 A1 | 1/2004 | Coffy et al. |
| 2004/0048503 A1 | 3/2004 | Mills et al. |
| 2004/0064422 A1 | 4/2004 | Leon |
| 2004/0070194 A1 | 4/2004 | Janetzke et al. |
| 2004/0083179 A1 | 4/2004 | Sesek et al. |
| 2004/0089482 A1 | 5/2004 | Ramsden et al. |
| 2004/0112950 A1 | 6/2004 | Manduley et al. |
| 2004/0122776 A1 | 6/2004 | Sansone |
| 2004/0122779 A1 | 6/2004 | Stickler et al. |
| 2004/0125413 A1 | 7/2004 | Cordery |
| 2004/0128264 A1 | 7/2004 | Leung et al. |
| 2004/0174012 A1 | 9/2004 | Hagen |
| 2004/0185827 A1 | 9/2004 | Parks |
| 2004/0185882 A1 | 9/2004 | Gecht et al. |
| 2004/0186811 A1 | 9/2004 | Gullo et al. |
| 2004/0200902 A1 | 10/2004 | Ishioroshi |
| 2004/0215523 A1 | 10/2004 | Wulff et al. |
| 2004/0215581 A1 | 10/2004 | Lord et al. |
| 2004/0215583 A1 | 10/2004 | Elliott |
| 2004/0220935 A1 | 11/2004 | McGraw et al. |
| 2004/0236938 A1 | 11/2004 | Callaghan |
| 2004/0241424 A1 | 12/2004 | Barbera-Guillem |
| 2004/0254898 A1 | 12/2004 | Parker et al. |
| 2005/0033653 A1 | 2/2005 | Eisenberg et al. |
| 2005/0065892 A1 | 3/2005 | Ryan et al. |
| 2005/0065896 A1 | 3/2005 | Kummer et al. |
| 2005/0065897 A1 | 3/2005 | Ryan et al. |
| 2005/0071296 A1 | 3/2005 | Lepkofker |
| 2005/0071297 A1 | 3/2005 | Kara |
| 2005/0080751 A1 | 4/2005 | Burningham |
| 2005/0082818 A1 | 4/2005 | Mertens |
| 2005/0087605 A1 | 4/2005 | Auslander et al. |
| 2005/0114276 A1 | 5/2005 | Hunter et al. |
| 2005/0116047 A1 | 6/2005 | Lu et al. |
| 2005/0119786 A1 | 6/2005 | Kadaba |
| 2005/0137949 A1 | 6/2005 | Rittman et al. |
| 2005/0171869 A1 | 8/2005 | Minnocci |
| 2005/0192899 A1 | 9/2005 | Reardon |
| 2005/0192911 A1 | 9/2005 | Mattern |
| 2005/0195214 A1 | 9/2005 | Reid et al. |
| 2005/0209913 A1 | 9/2005 | Wied et al. |
| 2005/0237203 A1 | 10/2005 | Burman et al. |
| 2005/0256811 A1 | 11/2005 | Pagel et al. |
| 2005/0278263 A1 | 12/2005 | Hollander et al. |
| 2005/0278266 A1 | 12/2005 | Ogg et al. |
| 2006/0000648 A1 | 1/2006 | Galtier |
| 2006/0020505 A1 | 1/2006 | Whitehouse |
| 2006/0116971 A1 | 6/2006 | Beckstrom et al. |
| 2006/0118631 A1 | 6/2006 | Lubow et al. |
| 2006/0122947 A1 | 6/2006 | Poulin |
| 2006/0136347 A1 | 6/2006 | Reichelsheimer et al. |
| 2006/0173796 A1 | 8/2006 | Kara |
| 2006/0190418 A1 | 8/2006 | Huberty et al. |
| 2006/0220298 A1 | 10/2006 | Fairweather et al. |
| 2006/0238334 A1 | 10/2006 | Mangan et al. |
| 2006/0259390 A1 | 11/2006 | Rosenberger |
| 2006/0283943 A1 | 12/2006 | Ostrowski et al. |
| 2006/0287096 A1 | 12/2006 | O'Kelley, II et al. |
| 2006/0293907 A1 | 12/2006 | Castineiras |
| 2007/0005518 A1 | 1/2007 | Beckstrom et al. |
| 2007/0011995 A1 | 1/2007 | Weaver et al. |
| 2007/0017985 A1 | 1/2007 | Lapstun et al. |
| 2007/0033110 A1 | 2/2007 | Philipp et al. |
| 2007/0073587 A1 | 3/2007 | Walker et al. |
| 2007/0078795 A1 | 4/2007 | Chatte |
| 2007/0080228 A1 | 4/2007 | Knowles et al. |
| 2007/0100672 A1 | 5/2007 | McBride et al. |
| 2007/0174215 A1 | 7/2007 | Morel |
| 2007/0179853 A1 | 8/2007 | Feige et al. |
| 2007/0185726 A1 | 8/2007 | Stickler et al. |
| 2007/0198441 A1 | 8/2007 | Kara |
| 2007/0253350 A1 | 11/2007 | Tung et al. |
| 2007/0255664 A1 | 11/2007 | Blumberg et al. |
| 2008/0046384 A1 | 2/2008 | Braun et al. |
| 2009/0125561 A1 | 5/2009 | Garcia |
| 2009/0164392 A1 | 6/2009 | Raju et al. |
| 2009/0171861 A1 | 7/2009 | Horree et al. |
| 2009/0212098 A1 | 8/2009 | Stratton et al. |
| 2010/0298662 A1 | 11/2010 | Yu et al. |
| 2010/0312627 A1 | 12/2010 | Khechef et al. |
| 2011/0015935 A1 | 1/2011 | Montgomery et al. |
| 2011/0022544 A1 | 1/2011 | Kim et al. |
| 2011/0029429 A1* | 2/2011 | Whitehouse .......... G06Q 20/10 705/39 |
| 2011/0071944 A1 | 3/2011 | Heiden et al. |
| 2011/0145107 A1 | 6/2011 | Greco |
| 2011/0204132 A1 | 8/2011 | Vera |
| 2011/0225180 A1 | 9/2011 | Liao et al. |
| 2012/0008766 A1 | 1/2012 | Robertson et al. |
| 2012/0159603 A1 | 6/2012 | Queck |
| 2012/0233252 A1 | 9/2012 | Vats et al. |
| 2012/0240204 A1 | 9/2012 | Bhatnagar et al. |

FOREIGN PATENT DOCUMENTS

| | | |
|---|---|---|
| EP | 153816 A2 | 9/1985 |
| EP | 0282359 A2 | 9/1988 |
| EP | 0507562 A2 | 10/1992 |
| EP | 0571259 A1 | 11/1993 |
| EP | 0596706 A1 | 5/1994 |
| EP | 0658861 A1 | 6/1995 |
| EP | 0782111 | 7/1997 |
| EP | 0900830 A1 | 3/1999 |
| EP | 0927958 A2 | 7/1999 |
| EP | 0927963 A2 | 7/1999 |
| EP | 1096429 A2 | 5/2001 |
| EP | 1525994 A2 | 4/2005 |
| FR | 2580844 A1 | 10/1986 |
| GB | 2246929 A | 2/1992 |
| GB | 2251210 A | 7/1992 |
| GB | 2271452 A | 4/1994 |
| JP | 63147673 | 6/1988 |
| JP | 04284558 B2 | 10/1992 |
| JP | 05132049 | 5/1993 |
| JP | 11249205 | 9/1999 |
| JP | 2000-105845 A | 4/2000 |
| JP | 2005215905 A | 8/2005 |
| WO | WO-88/01818 A1 | 3/1988 |
| WO | WO-94/27258 A1 | 11/1994 |
| WO | WO-95/17732 | 6/1995 |
| WO | WO-199519016 A1 | 7/1995 |
| WO | WO-97/14085 | 4/1997 |
| WO | WO-97/40472 A1 | 10/1997 |
| WO | WO-98/14907 A2 | 4/1998 |
| WO | WO-98/14909 | 4/1998 |
| WO | WO-98/57302 A1 | 12/1998 |
| WO | WO-98/57460 A1 | 12/1998 |
| WO | WO-02/063517 A2 | 8/2002 |
| WO | WO-03/039051 A2 | 5/2003 |
| WO | WO-03/083784 A1 | 10/2003 |
| WO | WO-2005042645 A2 | 5/2005 |
| WO | WO-2005060590 A2 | 7/2005 |

OTHER PUBLICATIONS

U.S. Appl. No. 13/172,066, McBride et al.
Ford, C., "Frequent Flyer Programs," Australian Accountant, 63,1, Feb. 1993, pp. 52-58, 7 pages.
Alexander, K.L., "U.S. Stamps Pay Tribute to Starry-Eyed Jurors," Final Edition, Calgary Herald, Calgary, Alberta, Canada, Sep. 14, 2007, 2 pages.
Non-Final Office Action dated Aug. 3, 2009 for U.S. Appl. No. 11/353,690 to Kara, filed Feb. 14, 2006, and entitled "System and Method for Validating Postage," 19 pages.
"Mobile Postage stamps via text message announced", http://telecoms.cytalk.com/2011/03/mobile-postage-stamps-via-text-messages-announced/, CY.TALK Telecoms News Blog, Mar. 14, 2011 in Telecoms, Texting, pp. 1-9.
Mobile Postage Stamps Via Text Messages Announced, Phone Reviews, Mobile Phones, NEWS, Mar. 11, 2011, pp. 1-3.

(56) References Cited

OTHER PUBLICATIONS

Anonymous, "Automated Indicia Detection System From Parascript Protects Postage Revenue for Postal Operators, Cracks Down on Fraud: Parascript StampVerify Simplifies Complex Task of Automatically Locating and Verifying Different Types of Indicia on Envelope Images-," PR Newswire, New York, Sep. 18, 2007, 2 pages.
Brown, B., "Internet Postage Services," PC Magazine, Jun. 6, 2000, p. 133, Ziff-Davis Publishing Company, 1 page.
"Zazzle® Offers Zazzle Custom Stamps™ for Business," May 17, 2006, https://www.zazzle.com/about/press/releases?pr=12624, 2 pages.
Porter, William, "Canadians Take to Vanity Stamps in Very Big Way," Denver Post, Jul. 9, 2000, 2 pages.
Derrick, J. "The Meter is Running," Office Systems, vol. 11 No. 9, Sep. 1994, 6 pages.
Computergram International, "U.S. Postal Service to Introduce PC Postage Plans Today," Aug. 9, 1999, No. 3720, 1 page.
Terrell, "Licking Stamps: A PC and a Printer Will End Trips to the Post Office," U.S. News & World Report, Sep. 28, 1998, vol. 125, No. 12, 4 pages.
"Miniature, Coin-Shaped Chip is Read or Written with a Touch," News Release, Dallas Semiconductor, Jul. 1991, 9 pages.
"Endicia Announces PictureItPostage™," Jun. 6, 2005, http://www.endicia.com/-/media/Files/About%20Us/Press%20Room/Endicia_pr05-06-06.ashx>, 2 pages.
Ralph, J. "What's Selling: From Bricks and Mortar to Bricks and Clicks," Playthings Magazine, Feb. 1, 2003, 4 pages.
Menezes, a.J. et al., "Handbook of Applied Cryptography," CRC Press LLC, 1997 (Excerpt—Cover pages and pp. 512-515), 22 pages.
"Information-Based Indicia Program (IBIP) Performance Criteria for Information-Based Indicia and Security Architecture for Closed IBI Postage Metering Systems (PCIBI-C)," Jan. 12, 1999, The United States Postal Service (USPS), 49 pages.
Stamps: Beyond Elvis, May 15, 1994, New York Times Archives, 2 pages.
Minnick, Robert, "Postage Imprinting Apparatus and Methods for Use With a Computer Printer", Apr. 27, 1995, 71 pages.
Office Action dated Mar. 13, 2007 for JP 515,253/97; with English language translation (4 pages).
Office Action issued for Japanese Patent Application No. 515,253/1997, dated Apr. 21,2009; 5 pages (with English language translation).
Appeal Decision dated Apr. 20, 2010 for U.S. Appl. No. 10/991,241 to Kara, filed Nov. 17, 2004, and entitled "System and Method for Generating Personalized Postage Indicia," 9 pages.
Examiner's Answer to Appeal Brief dated Feb. 19, 2009 for U.S. Appl. No. 10/991,241 to Kara, filed Nov. 17, 2004, and entitled "System and Method for Generating Personalized Postage Indicia," 14 pages.
Final Office Action dated Dec. 10, 2008 for U.S. Appl. No. 10/994,914 to McBride et al., filed Nov. 22, 2004, and entitled "Customized Computer-Based Value-Bearing Item Quality Assurance," 25 pages.
Final Office Action dated Dec. 4, 2009 for U.S. Appl. No. 11/644,458 to Leon, filed Dec. 20, 2006, and entitled "Systems and Methods for Creating and Providing Shape-Customized, Computer-Based, Value-Bearing Items," 17 pages.
Final Office Action dated Jan. 26, 2009 for U.S. Appl. No. 10/994,728 to Huebner et al., filed Nov. 22, 2004, and entitled "Printing of Computer-Based Value-Bearing Items," 13 pages.
Final Office Action dated Jan. 31, 2006 for U.S. Appl. No. 10/991,241 to Kara, filed Nov. 17, 2004, and entitled "System and Method for Generating Personalized Postage Indicia," 13 pages.
Final Office Action dated Jun. 23, 2009 for U.S. Appl. No. 11/114,964 to Clem et al., filed Apr. 25, 2005, and entitled "Quality Assurance of Image-Customization of Computer-Based Value-Bearing Items," 11 pages.
Final Office Action dated Jun. 30, 2010 for U.S. Appl. No. 11/114,964 to Clem et al., filed Apr. 25, 2005, and entitled "Quality Assurance of Image-Customization of Computer-Based Value-Bearing Items," 23 pages.
Final Office Action dated Mar. 15, 2010 for U.S. Appl. No. 10/994,914 to McBride et al., filed Nov. 22, 2004, and entitled "Customized Computer-Based Value-Bearing Item Quality Assurance," 31 pages.
Final Office Action dated Apr. 21, 2010 for U.S. Appl. No. 11/435,453 to Clem, filed May 16, 2006, and entitled "Rolls of Image-Customized Value-Bearing Items and Systems and Methods for Providing Rolls of Image-Customized Value-Bearing Items," 12 pages.
Final Office Action dated Mar. 16, 2010 for U.S. Appl. No. 10/994,728 to Huebner et al., filed Nov. 22, 2004, and entitled "Printing of Computer-Based Value-Bearing Items," 13 pages.
Final Office Action dated Mar. 4, 2009 for U.S. Appl. No. 10/994,698 to Leon et al., filed Nov. 22, 2004, and entitled "Image Customization of Computer-Based Value-Bearing Items," 12 pages.
Final Office Action dated May 11, 2010 for U.S. Appl. No. 10/994,698 to Leon et al., filed Nov. 22, 2004, and entitled "Image Customization of Computer-Based Value-Bearing Items," 18 pages.
Final Office Action dated Nov. 4, 2010 for U.S. Appl. No. 11/644,458 to Leon, filed Dec. 20, 2006, and entitled "Systems and Methods for Creating and Providing Shape-Customized, Computer-Based, Value-Bearing Items," 22 pages.
Interview Summary dated Sep. 2, 2010 for U.S. Appl. No. 11/644,458 to Leon, filed Dec. 20, 2006, and entitled "Systems and Methods for Creating and Providing Shape-Customized, Computer-Based, Value-Bearing Items," 4 pages.
Non-Final Office Action dated Apr. 16, 2009 for U.S. Appl. No. 11/644,458 to Leon, filed Dec. 20, 2006, and entitled "Systems and Methods for Creating and Providing Shape-Customized, Computer-Based, Value-Bearing Items," 15 pages.
Non-Final Office Action dated Apr. 17, 2008 for U.S. Appl. No. 10/994,914 to McBride et al., filed Nov. 22, 2004, and entitled "Customized Computer-Based Value-Bearing Item Quality Assurance," 19 pages.
Non-Final Office Action dated Aug. 11, 2009 for U.S. Appl. No. 11/435,453 to Clem., filed May 16, 2006, and entitled "Rolls of Image-Customized Value-Bearing Items and Systems and Methods for Providing Rolls of Image-Customized Value-Bearing Items," 9 pages.
Non-Final Office Action dated Aug. 19, 2008 for U.S. Appl. No. 10/994,698 to Leon et al., filed Nov. 22, 2004, and entitled " Image Customization of Computer-Based Value-Bearing Items," 16 pages.
Non-Final Office Action dated Aug. 19, 2009 for U.S. Appl. No. 10/994,728 to Huebner et al., filed Nov. 22, 2004, and entitled "Printing of Computer-Based Value-Bearing Items," 13 pages.
Non-Final Office Action dated Aug. 26, 2009 for U.S. Application No. 10/994,914 to McBride et al., filed Nov. 22, 2004, and entitled "Customized Computer-Based Value-Bearing Item Quality Assurance," 29 pages.
Non-Final Office Action dated Aug. 3, 2009 for U.S. Appl. No. 10/994,698 to Leon et al., filed Nov. 22, 2004, and entitled " Image Customization of Computer-Based Value-Bearing Items," 13 pages.
Non-Final Office Action dated Dec. 12, 2007 for U.S. Appl. No. 11/635,871 to McBride et al., filed Dec. 8, 2006, and entitled "Formatting Value-Bearing Item Indicia," 5 pages.
Non-Final Office Action dated Dec. 23, 2009 for U.S. Appl. No. 11/114,964 to Clem et al., filed Apr. 25, 2005, and entitled "Quality Assurance of Image-Customization of Computer-Based Value-Bearing Items," 21 pages.
Non-Final Office Action dated Dec. 31, 2007 for U.S. Appl. No. 10/991,241 to Kara, filed Nov. 17, 2004, and entitled "System and Method for Generating Personalized Postage Indicia," 11 pages.
Non-Final Office Action dated Dec. 9, 2009 for U.S. Appl. No. 11/729,239 to Leon et al., filed Mar. 28, 2007, and entitled "Computer-Based Value-Bearing Item Customization Security," 6 pages.
Non-Final Office Action dated Jul. 12, 2007 for U.S. Appl. No. 10/991,241 to Kara, filed Nov. 17, 2004, and entitled "System and Method for Generating Personalized Postage Indicia," 11 pages.

(56) References Cited

OTHER PUBLICATIONS

Non-Final Office Action dated Jul. 19, 2005 for U.S. Appl. No. 10/991,241 to Kara, filed Nov. 17, 2004, and entitled "System and Method for Generating Personalized Postage Indicia," 9 pages.
Non-Final Office Action dated Jul. 21, 2010 for U.S. Appl. No. 10/994,914 to McBride et al., filed Nov. 22, 2004, and entitled "Customized Computer-Based Value-Bearing Item Quality Assurance," 33 pages.
Non-Final Office Action dated Jul. 7, 2008 for U.S. Appl. No. 10/991,241 to Kara, filed Nov. 17, 2004, and entitled "System and Method for Generating Personalized Postage Indicia," 12 pages.
Non-Final Office Action dated Feb. 23, 2011 for U.S. Appl. No. 12/943,519 to Clem, filed Nov. 10, 2010, and entitled "Rolls of Image-Customized Value-Bearing Items and Systems and Methods for Providing Rolls of Image-Customized Value-Bearing Items," 8 pages.
Non-Final Office Action dated Jun. 19, 2007 for U.S. Appl. No. 11/635,871 to McBride et al., filed Dec. 8, 2006, and entitled "Formatting Value-Bearing Item Indicia," 5 pages.
Non-Final Office Action dated May 29, 2008 for U.S. Appl. No. 10/994,728 to Huebner et al., filed Nov. 22, 2004, and entitled "Printing of Computer-Based Value-Bearing Items," 11 pages.
Non-Final Office Action dated May 7, 2010 for U.S. Appl. No. 11/644,458 to Leon, filed Dec. 20, 2006, and entitled "Systems and Methods for Creating and Providing Shape-Customized, Computer-Based, Value-Bearing Items," 18 pages.
Non-Final Office Action dated Nov. 26, 2008 for U.S. Appl. No. 11/114,964 to Clem et al., filed Apr. 25, 2005, and entitled "Quality Assurance of Image-Customization of Computer-Based Value-Bearing Items," 9 pages.
Non-Final Office Action dated Oct. 31, 2006 for U.S. Appl. No. 10/991,241 to Kara, filed Nov. 17, 2004, and entitled "System and Method for Generating Personalized Postage Indicia," 11 pages.
Notice of Abandonment dated Jun. 30, 2010 for U.S. Appl. No. 10/991,241 to Kara, filed Nov. 17, 2004, and entitled "System and Method for Generating Personalized Postage Indicia," 2 pages.
Notice of Allowance dated Aug. 5, 2010 for U.S. Appl. No. 11/435,453 to Clem, filed May 16, 2006, and entitled "Rolls of Image-Customized Value-Bearing Items and Systems and Methods for Providing Rolls of Image-Customized Value-Bearing Items," 11 pages.
Notice of Allowance dated Dec. 2, 2010 for U.S. Appl. No. 10/994,698 to Leon et al., filed Nov. 22, 2004, and entitled " Image Customization of Computer-Based Value-Bearing Items," 5 pages.
Notice of Allowance dated Feb. 3, 2011 for U.S. Appl. No. 11/114,964 to Clem et al., filed Apr. 25, 2005, and entitled "Quality Assurance of Image-Customization of Computer-Based Value-Bearing Items," 7 pages.
Notice of Allowance dated Jan. 5, 2007 for U.S. Appl. No. 10/994,768 to Leon et al., filed Nov. 22, 2004, and entitled "Computer-Based Value-Bearing Item Customization Security," 7 pages.
Notice of Allowance dated Jul. 15, 2008 for U.S. Appl. No. 11/635,871 to McBride et al., filed Dec. 8, 2006, and entitled "Formatting Value-Bearing Item Indicia," 7 pages.
Notice of Allowance dated Jun. 24, 2010 for U.S. Appl. No. 11/729,239 to Leon et al., filed Mar. 28, 2007, and entitled "Computer-Based Value-Bearing Item Customization Security," 6 pages.
Notice of Allowance dated Nov. 17, 2008 for U.S. Appl. No. 11/635,871 to McBride et al., filed Dec. 8, 2006, and entitled "Formatting Value-Bearing Item Indicia," 7 pages.
Notice of Allowance dated Nov. 24, 2008 for U.S. Appl. No. 10/197,044 to Raju et al., filed Jul. 16, 2002, and entitled "Generic Value Bearing Item Labels," 7 pages.

U.S. Appl. No. 10/994,698 to Leon et al., filed Nov. 22, 2004, and entitled " Image Customization of Computer-Based Value-Bearing Items," 126 pages.
U.S. Appl. No. 10/994,728 to Huebner et al., filed Nov. 22, 2004, and entitled "Printing of Computer-Based Value-Bearing Items," 122 pages.
U.S. Appl. No. 10/994,914 to McBride et al., filed Nov. 22, 2004, and entitled "Customized Computer-Based Value-Bearing Item Quality Assurance," 131 pages.
U.S. Appl. No. 11/114,964 to Clem et al., filed Apr. 25, 2005, and entitled "Quality Assurance of Image-Customization of Computer-Based Value-Bearing Items," 122 pages.
U.S. Appl. No. 11/435,453 to Clem, filed May 16, 2006, and entitled "Rolls of Image-Customized Value-Bearing Items and Systems and Methods for Providing Rolls of Image-Customized Value-Bearing Items," 69 pages.
U.S. Appl. No. 11/644,458 to Leon, filed Dec. 20, 2006, and entitled "Systems and Methods for Creating and Providing Shape-Customized, Computer-Based, Value-Bearing Items," 77 pages.
U.S. Appl. No. 11/729,239 to Leon et al., filed Mar. 28, 2007 and entitled "Computer-Based Value-Bearing Item Customization Security," 131 pages.
U.S. Appl. No. 12/316,240 to Leon, filed Dec. 9, 2008, and entitled "Systems and Methods for Facilitating Replacement of Computer-Based Value-Bearing Items," 158 pages.
U.S. Appl. No. 12/500,970 to Clem, filed Jul. 10, 2009, and entitled "Automatic Guarantee Delivery Tracking and Reporting for United States Postal Service Postage Refunds for Paid Computer-Based Postage," 70 pages.
U.S. Appl. No. 12/943,519 to Clem, filed Nov. 10, 2010, and entitled "Rolls of Image-Customized Value-Bearing Items and Systems and Methods for Providing Rolls of Image-Customized Value-Bearing Items," 65 pages.
U.S. Appl. No. 13/038,029 to Leon et al, filed Mar. 1, 2011 and entitled "Image-Customization of Computer-Based Value-Bearing Items," 131 pages.
U.S. Appl. No. 13/081,356 to Leon et al, filed Apr. 6, 2011 and entitled "Computer-Based Value-Bearing Item Customization Security," 136 pages.
Unpublished U.S. Appl. No. 11/509,309 to Leon filed Aug. 24, 2006 and entitled "Invisible Fluorescent Ink Mark," 15 pages.
International Search Report attached to PCT Application WO/88/01818, dated Nov. 30, 1987, 2 pages.
International Search Report issued for Application PCT/US96/16366, dated Jun. 13, 1997, 9 pages.
Unpublished U.S. Appl. No. 11/323,463 to Leon et al., filed Dec. 30, 2005 and entitled "Systems and Methods for Single Pass Printing Postage Indicia," 23 pages.
Davies, Brad L. "Printing System for Preventing Injustice by Delivering Print Data from Postal Charge Meter to Printer," Jan. 2001, 1 page.
Unpublished U.S. Appl. No. 13/172,066 to McBride et al., filed Jun. 29, 2011 and entitled " Systems and Methods Using Mobile Communication Handsets for Providing Postage," 50 pages.
Feare, Tom, "Shipping System Saves $2 Million Yearly," Modern Materials Handling, Aug. 2000, 55, 9; pp. A6-A7.
Domestic Mail Manual Section 604, Aug. 31, 2005.
Martorelli, Business Reply Mail, Winton M. Blount Postal History Symposium, Sep. 2011, 13 pages.
FedEx, "The Mobile Shipping Label", One Scan. Done just in time for this holiday season, email advertisement, Dec. 15, 2011.

* cited by examiner ved for each such flat rate shipping container individually at or near a time of shipping. In particular, the postage indicia often comprises an information based indicia (IBI) in which information unique to the sender, recipient, and shipping date is incorporated. Moreover, the USPS, for example, implements a "known mailer" requirement with respect to some packages shipped (e.g., packages larger than a flat or envelope), such as for security and/or anti-terrorism purposes, and thus requires information about the shipper to be collected in association with generation of value bearing postage indicia used for shipping packages. Accordingly, it is typically necessary for this information to be provided for each package shipped using the aforementioned flat rate shipping containers.

PERPETUAL VALUE BEARING SHIPPING LABELS

CROSS-REFERENCE TO RELATED APPLICATIONS

The present application is related to co-pending and commonly assigned U.S. patent application Ser. No. 12/030,739 entitled "Systems and Methods for Distributed Activation of Postage," filed Feb. 13, 2008, and Ser. No. 13/172,066 entitled "Systems and Methods Using Mobile Communication Handsets for Providing Postage," filed Jun. 29, 2011, the disclosures of which are hereby incorporated herein by reference.

TECHNICAL FIELD

The present invention relates generally to shipping labels bearing value for shipping services and, more particularly, to value bearing shipping labels having a perpetual or relatively long shelf life.

BACKGROUND OF THE INVENTION

Shipment of parcels and other relatively bulky items (e.g., larger than 6⅛ inches by 11¼ inches), such as flats and boxes, (collectively referred to as packages) has been simplified in recent years. For example, the United States Postal Service (USPS) has introduced various flat rate shipping containers (e.g., envelope and small, medium, and large boxes), each having a flat shipping rate associated with the use thereof such that any item(s) fitting within such a container may be shipped from and to anywhere within the United States for the corresponding flat shipping rate. Such flat rate shipping has simplified shipping for many individuals by eliminating the need for scales, rating tables, etc.

It should be appreciated that, although the foregoing flat rate shipping containers have a flat shipping rate associated therewith (i.e., one shipping rate regardless of package weight, package origination location, and package destination location), the flat shipping rate is not a fixed rate. That is, the flat rate for any particular flat rate shipping container may change over time. For example, the flat rates for each such flat rate shipping container may be changed periodically, such as annually, to compensate for increased shipping costs, inflation, etc.

In an effort to make the use of such flat rate shipping containers still more convenient to the shipper, the USPS provides the aforementioned flat rate shipping containers to shippers free of charge. Moreover, the USPS even provides delivery of the flat rate shipping containers to shippers upon request. The shippers still must, however, purchase postage in the amount of the flat shipping rate and apply that postage to the flat rate shipping containers prior to their use. Accordingly, many shippers wishing to take advantage of the simplified flat rate shipping must still visit a post office or other service provider in order to purchase the requisite postage.

Personal computer (PC) based postage on demand systems, such as those described in U.S. Pat. Nos. 5,510,992 and 5,822,739, the disclosures of which are hereby incorporated herein by reference, provide the convenience of printing value bearing postage indicia on demand by a shipper. However, the use of such systems in association with the use of flat rate shipping containers may remain inconvenient for shippers in some situations. For example, the value bearing postage indicia must typically be generated for each such flat rate shipping container individually at or near a time of shipping. In particular, the postage indicia often comprises an information based indicia (IBI) in which information unique to the sender, recipient, and shipping date is incorporated. Moreover, the USPS, for example, implements a "known mailer" requirement with respect to some packages shipped (e.g., packages larger than a flat or envelope), such as for security and/or anti-terrorism purposes, and thus requires information about the shipper to be collected in association with generation of value bearing postage indicia used for shipping packages. Accordingly, it is typically necessary for this information to be provided for each package shipped using the aforementioned flat rate shipping containers.

Moreover, the date of shipping is generally required to be the date of generation of the postage indicia. That is, the shelf life of the postage indicia is extremely short. Such a date restriction on the use of the generated postage indicia has traditionally been imposed upon metered postage indicia (whether PC based or more traditional postage meter based) to discourage fraud and to assure that the proper amount of postage is paid (e.g., to prevent an improper amount of postage to be applied where the indicia was generated using a then current rating table but the postal item posted after a change in rates). Accordingly, shippers using PC based postage on demand systems must generally generate and print postage indicia on the same day the package is to be shipped. Such postage indicia generation and printing operations, although often highly automated and reasonably quick, are often inconvenient to a shipper in particular situations (e.g., having to launch a shipping application for shipping a single package).

BRIEF SUMMARY OF THE INVENTION

The present invention is directed to systems and methods which facilitate fixed rate shipping through the use of value bearing shipping labels (referred to herein as perpetual value bearing shipping labels) having perpetual or otherwise long lived viability (referred to herein as substantially perpetual viability). In particular, the substantially perpetual viability of the value borne by perpetual value bearing shipping labels herein provides a shelf life for the perpetual value bearing shipping labels which exceeds a shipping rate change epoch. Accordingly, although a perpetual value bearing shipping label may be generated or otherwise acquired when a then current rating table is in effect, the perpetual value bearing shipping label may be used for shipping a package after a change in shipping rates occurs.

Perpetual value bearing shipping labels of embodiments of the invention are preferably provided to shippers as a fungible product for use at their freedom. That is, perpetual value bearing shipping labels of embodiments are pre-produced (e.g., in advance of shipping activity in which they are to be utilized) in a form which is delivery destination and package content agnostic for later use by a shipper as needed. Such perpetual value bearing shipping labels may be affixed, for example, to corresponding flat rate shipping containers having a flat shipping rate corresponding to the value borne by the perpetual value bearing shipping label. Thus, as a shipper is later performing a shipping activity (e.g., shipping a product to a particular intended recipient), the shipper may select any appropriately sized flat rate shipping container having a perpetual value bearing shipping label affixed thereto for use in shipping a package to a destination address of the intended recipient. Such selection and use of the perpetual value bearing shipping label may be well after a time at which it was generated, and even after an increase in the flat shipping rate associated with the flat rate shipping container has increased.

Perpetual value bearing shipping labels of embodiments may be made available to shippers in various ways. For example, an on-line fulfillment system may be provided in which shippers may select a desired number of perpetual value bearing shipping labels in one or more value bearing amount (e.g., a first number of flat rate envelopes, a second number of small flat rate shipping containers, a third number of medium flat rate shipping containers, and/or a fourth number of large flat rate shipping containers each having perpetual value bearing shipping labels of appropriate value attached thereto) for purchase by and delivery to the shipper for later use. On-line fulfillment systems of embodiments of the invention may use information regarding the address to which the purchased perpetual value bearing shipping labels are to be delivered and/or payment information (e.g., credit/debit card information, electronic check information, online payment service information, etc.), used in purchasing the perpetual value bearing shipping labels, as information to satisfy a known shipper information requirement. Even shippers which otherwise do not have a postage metering account (e.g., an on-line PC based postage on demand metering account) may nevertheless purchase and use perpetual value bearing shipping labels in accordance with the concepts herein.

Another way in which perpetual value bearing shipping labels may be made available to shippers is through point of sale acquisition. For example, various numbers of flat rate envelopes, small flat rate shipping containers, medium flat rate shipping containers, and/or large flat rate shipping containers, each having perpetual value bearing shipping labels of appropriate value attached thereto, may be stocked at a retail location for selection and purchase by shippers. Purchaser information collected from a purchaser's payment information (e.g., credit/debit card information, check information, etc.) and/or retail establishment membership (e.g., wholesale club membership, rewards program membership, etc.), used in association with the purchase of the perpetual value bearing shipping labels, may be used as information to satisfy a known shipper information requirement. Where such information may not be available at point of sale acquisition (e.g., where a cash point of sale transaction is performed) or may otherwise not be associable with the perpetual value bearing shipping labels being purchased, embodiments may limit the sale of perpetual value bearing shipping labels to those for uses not having known shipper information requirements (e.g., restrict sales to flat rate envelopes). Of course, where known shipper information is not used or is otherwise not required, embodiments of the invention may make any appropriate perpetual value bearing shipping labels available to suitable purchasers. From the above it can be appreciated that perpetual value bearing shipping labels of embodiments of the invention may be made conveniently available to a large population of shippers.

Perpetual value bearing shipping labels of embodiments herein, although providing valid viable postage for use in obtaining shipping services, are provided as fungible products and do not include delivery information (e.g., destination address information) as pre-produced and made available to shippers in advance of shipping activity in which they are to be utilized. Accordingly, shippers may apply delivery information, such as in the form of a destination address, when preparing a package for shipping as part of their shipping activity. Where shipper information is available at the time of generating the perpetual value bearing shipping labels (e.g., when using embodiments of the aforementioned on-line fulfillment system), return address information (e.g., derived from purchaser information) may be included in the perpetual value bearing information. However, where shipper information is not available at the time of generating the perpetual value bearing shipping labels (e.g., when generated for making the perpetual value bearing shipping labels available as fungible products for point of sale acquisition) return address information may not be included in the perpetual value bearing shipping labels as pre-produced and made available to shippers. A shipper may thus apply shipper information, such as in the form of a return address, when preparing a package for shipping as part of their shipping activity.

Various forms of metering systems may be utilized in generating perpetual value bearing shipping labels according to embodiments of the invention. For example, metering systems suitable for on-demand metering operations may be utilized according to embodiments herein. In operation according to an embodiment of the invention, an on-line fulfillment system utilizes on-demand metering technology to generate perpetual value bearing shipping labels. Similarly, perpetual value bearing shipping labels provided for point of sale acquisition according to an embodiment of the invention are generated by on-demand metering technology. Although perhaps adapted in some ways to provide functionality as described herein, embodiments of the invention are adapted to utilize such metering technology with little or relatively minor alteration. For example, requests for generation of value indicia for the perpetual value bearing shipping labels and/or for generation of the perpetual value bearing shipping labels themselves may be provided in a format consistent with usual operation of a metering system, although perhaps using data unique to the perpetual value bearing shipping label (e.g., a layout parameter unique to use in perpetual value bearing shipping labels), null or dummy data (e.g., data to fill data blocks expected by the on-demand metering system but which is not actually used by the perpetual value bearing shipping labels, etc.). Similarly, reporting and audit information provided by the metering system used to generate value indicia for perpetual value bearing shipping labels may be provided in a format consistent with the usual operation of the metering system (e.g., includes data fields not actually used by the perpetual value bearing shipping labels). Such embodiments facilitate leveraging the use of existing systems and protocols to facilitate the adoption of the use of perpetual value bearing shipping labels of embodiments of the invention.

Perpetual value bearing shipping labels of embodiments of the invention may implement one or more security techniques to discourage fraud and/or misuse. For example, purchaser information may be included in or associated with particular perpetual value bearing shipping labels, as previously mentioned, for tracing and logging purposes. Additionally or alternatively, perpetual value bearing shipping labels may utilize IBI and/or other secure data packets for value security purposes. Embodiments of perpetual value bearing shipping labels may additionally or alternatively utilize specialized label stock (e.g., stock bearing a watermark, micro-printing, features which are visible/invisible in particular situations, etc.) for authentication purposes.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWING

For a more complete understanding of the present invention, reference is now made to the following descriptions taken in conjunction with the accompanying drawing, in which.

DETAILED DESCRIPTION OF THE INVENTION

Figure 1:
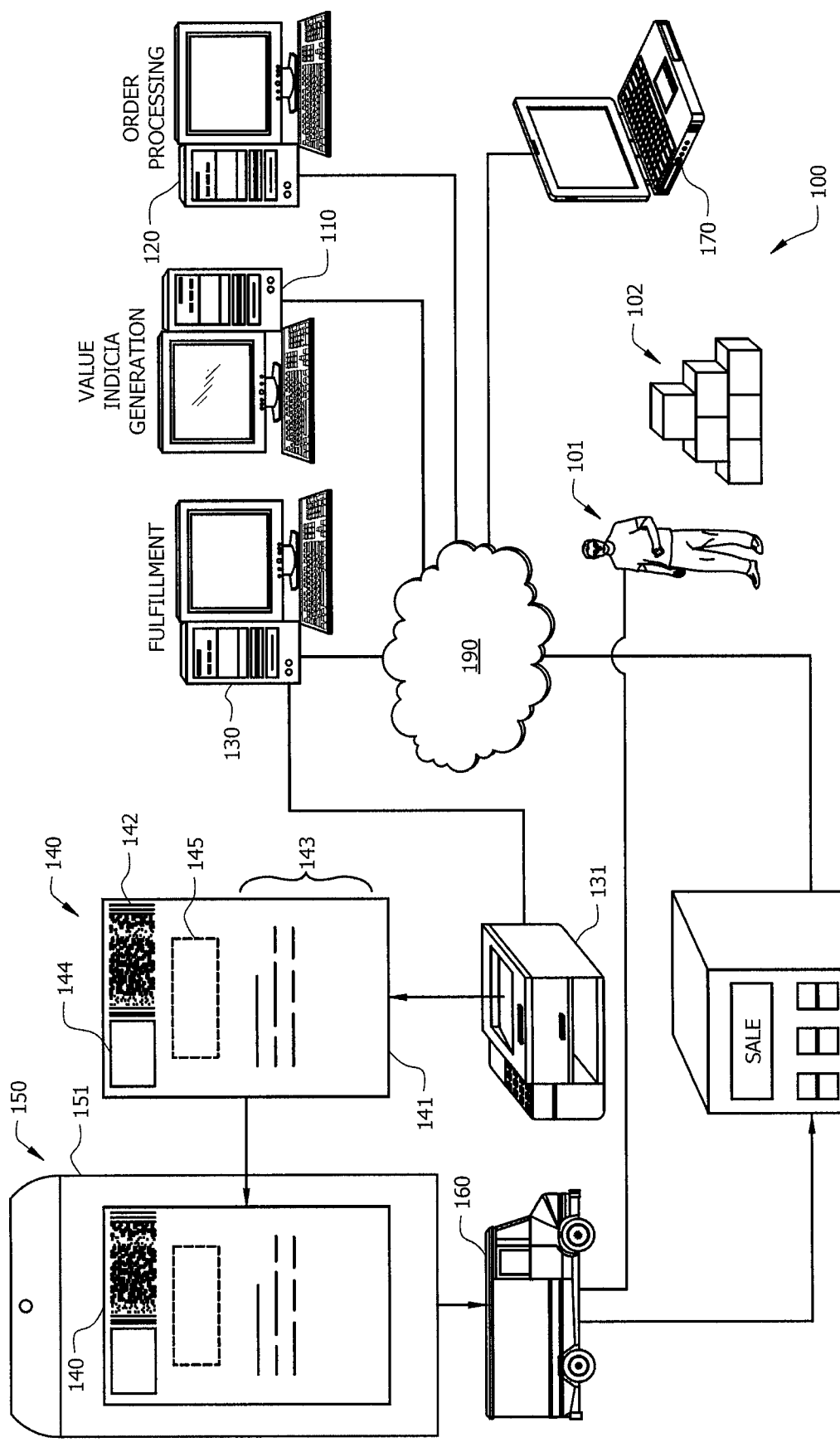
FIG. 1 shows a system adapted according to embodiments of the invention.

FIG. 1 shows system 100 adapted to facilitate fixed rate shipping through the use of perpetual value bearing shipping labels (represented as perpetual value bearing shipping label 140) having substantially perpetual viability. Perpetual value bearing shipping labels of the illustrated embodiment are provided to shippers (e.g., shipper 101) as fungible products (represented as perpetual value bearing shipping label product 150) for use at their freedom in shipping various items (e.g., items 102).

In operation according to embodiments of the invention, system 100 operates to pre-produce perpetual value bearing shipping labels (e.g., in advance of shipping activity in which they are to be utilized) in a form which is delivery destination and package content agnostic for later use by a shipper as needed. Accordingly, order processing system 110, value indicia generation system 120, and fulfillment system 130 of embodiments cooperate to provide perpetual value bearing shipping label products for use by shippers in accordance with the concepts herein.

Order processing system 110 of embodiments provides a processor-based system (e.g., one or more network application server and associated peripherals) adapted to process orders from various persons and entities (referred to herein as shippers) desirous of obtaining perpetual value bearing shipping labels herein. Accordingly, order processing system 110 of embodiments is adapted to communicate with systems submitting order requests, to accept payment and other information related to orders, to communicate with payment processing systems (e.g., credit card and/or check clearing house systems), and to cooperate with other systems utilized in providing perpetual value bearing shipping labels.

Value indicia generation system 120 of embodiments provides a processor-based system (e.g., one or more network application server and associated peripherals) adapted to generate value indicia (e.g., secure data packet 142) in accordance with information provided thereto. Accordingly, value indicia generation system 120 of embodiments is adapted to communicate with systems (e.g., order processing system 110) providing value indicia generation information, to generate and appropriately account for value indicia (e.g., access one or more crypto vault storing value), and to cooperate with other systems utilized in providing perpetual value bearing shipping labels.

Fulfillment system 130 of embodiments provides a processor-based system (e.g., one or more network application server and associated peripherals) adapted to provide perpetual value bearing shipping label products for fulfilling orders from shippers desirous of obtaining perpetual value bearing shipping labels herein. Accordingly, fulfillment system 130 of embodiments is adapted to communicate with systems (e.g., value indicia generation system 120) providing value indicia information, to output perpetual value bearing shipping labels (e.g., using printer 131), and to facilitate providing the perpetual value bearing shipping labels to shippers as perpetual value bearing shipping label products.

The processor-based systems of order processing system 110, value indicia generation system 120, and fulfillment system 130 of embodiments comprise a processor (e.g., central processing unit (CPU), application specific integrated circuit (ASIC), programmable gate array (PGA), and/or the like) operable under control of an instruction set (e.g., software, firmware, applet, code segment, and/or the like) for providing the functionality described herein. For example, any or all of order processing system 110, value indicia generation system 120, and fulfillment system 130 may comprise a computer based upon the CORE or PENTIUM processor families available from Intel Corporation. Such processor-based systems preferably comprise memory, such as random access memory (RAM), read only memory (ROM), flash memory, disk memory, optical memory, cryptographically protected memory, and/or the like. Moreover, such processor-based systems include appropriate input and output, such as network interface cards (NIC), wireless communication ports (e.g., wireless local area network (WLAN) adapters, cellular network interfaces, etc.), peripheral interfaces (e.g., universal serial bus (USB), parallel interface, serial interface, small computer system interface (SCSI), advanced technology attachment (PATA), serial advanced technology attachment (SATA), etc.), and display interfaces, input interfaces (e.g., keyboard, touch screen, digital pointer, etc.), to provide functionality according to embodiments.

It should be appreciated that although shown in the illustrated embodiment as separate systems, order processing system 110, value indicia generation system 120, and fulfillment system 130 may be provided in other configurations, whether combined or further distributed. A system configuration in which one or more of order processing system 110, value indicia generation system 120, and/or fulfillment system 130 are combined may be desired in some situations, such as where fewer network application server resources are available. A system configuration in which one or more of order processing system 110, value indicia generation system 120, and/or fulfillment system 130 are separated may be desired in other situations, such as where different service providers cooperate to provide the perpetual value bearing shipping label products (e.g., an order processing service provider, a value bearing indicia generation service provider, and/or an order fulfillment service provider).

Network 190 of the illustrated embodiment provides communication links facilitating the communication between various systems and components of system 100, such as order processing system 110, value indicia generation system 120, and fulfillment system 130. Accordingly, network 190 may comprise any number of network configurations, such as the Internet, an intranet, the public switched telephone network (PSTN), a local area network (LAN), a metropolitan area network (MAN), a wide area network (WAN), a cellular network, a wireless network, a cable transmission network, and/or the like.

Perpetual value bearing shipping label 140 provided by operation of system 100 according to embodiments comprises a shipping label adapted for affixing to a package and providing proof of payment for shipping services. Accordingly, shipping label 140 of the illustrated embodiment comprises label stock 141, such as may comprise a printable substrate having a pressure sensitive adhesive backing, bearing various printed and/or other information thereon.

Perpetual value bearing shipping labels of embodiments of the invention may implement one or more security techniques to discourage fraud and/or misuse. For example, the value borne by perpetual value bearing shipping label 140 of the illustrated embodiment is provided in secure data packet 142 (e.g., digitally signed information in machine readable form, such as a barcode) to provide security and/or tamper resistance. Secure data packet 142 of embodiments may comprise an IBI meeting postal (USPS) and/or other shipping service provider specifications to thereby provide a value indicia (i.e., an indicia which is itself representative of a particular pecuniary amount and thus has pecuniary value) according to embodiments of the invention. Security techniques in addition to or in the alternative to the aforementioned secure data packet may be utilized with respect to perpetual value bearing shipping label 140 of embodiments. For example, label stock 141 of the illustrated embodiment comprises specialized label stock having security feature 145 provided thereon. Security feature 145 of embodiments may comprise a watermark, micro-printing, features which are visible/invisible in particular situations, etc., such as may be used for authentication purposes. Security feature 145 of embodiments may comprise a serial number or other substantially unique information (i.e., information which is not repeated in typical use and thus may be relied upon as unique information) which is associated with a particular security data packet 142 (e.g., the substantially unique information of security feature 145 may be included in secure data packet 142 when generated for use in validating perpetual value bearing shipping label 140).

Perpetual value bearing shipping labels of embodiments herein, although providing valid viable postage for use in obtaining shipping services, are provided as fungible products and do not include delivery information (e.g., destination address information) as produced by system 100. Accordingly, perpetual value bearing shipping label 140 of the illustrated embodiment comprises delivery information area 143 which is devoid of specific delivery information when generated by system 100. For example, delivery information area 143 may comprise a number of blank lines for receiving delivery information specific to a use to which perpetual value bearing shipping label 140 is ultimately put by shipper 101. Shippers (e.g., shipper 101) may thus apply delivery information to perpetual value bearing shipping label 140, such as in the form of a destination address, when preparing a package for shipping as part of their shipping activity.

Perpetual value bearing shipping labels of embodiments include or are adapted to include shipper information. Accordingly, perpetual value bearing shipping label 140 of the illustrated embodiment comprises shipper information area 144. As will be better understood from the discussion below, shipper information may or may not be available to system 100 at the time of generating perpetual value bearing shipping labels herein. Where such shipper information, or information from which shipper information may be inferred (e.g., purchaser information), is available to system 100 at the time of generating perpetual value bearing shipping label 140, shipper information area 144 may include shipping information when perpetual value bearing shipping label 140 is generated by system 100. However, where such shipper information is not available to system 10 at the time of generating perpetual value bearing shipping label 140, shipper information area 144 may be devoid of specific shipper information when generated by system 100. For example, shipper information area 144 may comprise a number of blank lines for receiving shipper information. Shippers (e.g., shipper 101) may thus apply shipper information to perpetual value bearing shipping label 140, such as in the form of a return address, when preparing a package for shipping as part of their shipping activity.

Additional or alternative information and/or features may be provided as part of perpetual value bearing shipping labels of embodiments herein. For example, delivery confirmation or tracking information may be printed upon label stock 141 as part of perpetual value bearing shipping label 140. Likewise, information such as postal class, value indicia amount, etc., images such as logos, photographic images, icons, etc., and/or the like may be included as a part of perpetual value bearing shipping labels herein.

Perpetual value bearing shipping labels generated according to embodiments of the invention may themselves provide perpetual value bearing shipping label products (e.g., one or more pre-generated perpetual value bearing shipping label provides a retail unit having a stock keeping unit (SKU) identifier associated therewith). However, perpetual value bearing shipping labels of embodiments of the invention are combined with additional materials to provide perpetual value bearing shipping label products, such as for shipper convenience, to ensure proper use by shippers, etc. Perpetual value bearing shipping label 140 of the illustrated embodiment is combined with shipping container 151 to provide perpetual value bearing shipping label product 150. Shipping container 151 may, for example, comprise a flat rate shipping container (e.g., an envelope, small box, medium box, or large box) having a flat shipping rate appropriate to the value borne by perpetual value bearing shipping label 140. Accordingly, a shipper is provided the convenience of a pre-paid flat rate shipping container having a substantially perpetual shelf life for use at their freedom in shipping various items. Likewise, appropriate use of the perpetual value bearing shipping label may be controlled by being affixed to a shipping container as delivered to a shipper (e.g., a shipper is prevented from applying the perpetual value bearing shipping label to an improperly sized shipping container, whether purposefully or accidentally).

Perpetual value bearing shipping label products herein are preferably provided to shippers for later use in shipping items. For example, delivery service 160 may be utilized to provide perpetual value bearing shipping label product 150 to reseller 180 for acquisition by shipper 101. Additionally or alternatively, delivery service 160 may be utilized to provide perpetual value bearing shipping label product 150 directly to shipper 101. Delivery service 160 may comprise a shipping service provider, such as a shipping service provider for which perpetual value bearing shipping labels are to be used, a courier service, an expedited delivery service, a parcel delivery service, "will call" delivery infrastructure, and/or the like.

As can be appreciated from the foregoing, perpetual value bearing shipping labels of embodiments may be made available to shippers in various ways. For example, a resale system may be provided to facilitate resellers (e.g., reseller 180, such as may comprise an office supply retailer, a shipping service provider customer facility, a wholesale club, etc.) providing perpetual value bearing shipping label products for acquisition and use by shippers. Additionally or alternatively, an on-line fulfillment system may be provided to facilitate shippers directly ordering perpetual value bearing shipping label products for their use. As will be more fully understood from the discussion which follows, shipper 101 may use user terminal 170 (e.g., a processor-based system, such as may comprise a general purpose computer, a public use kiosk, a special purpose computer, etc.) to place an order for perpetual value bearing shipping label products of embodiments. User terminal 170 may comprise a processor (e.g., central processing unit (CPU), application specific integrated circuit (ASIC), programmable gate array (PGA), and/or the like) operable under control of an instruction set (e.g., software, firmware, applet, code segment, and/or the like) for providing the functionality described herein. Embodiments of user terminal 170 comprise a network enabled PC operating under control of software to provide functionality herein.

Figure 2:
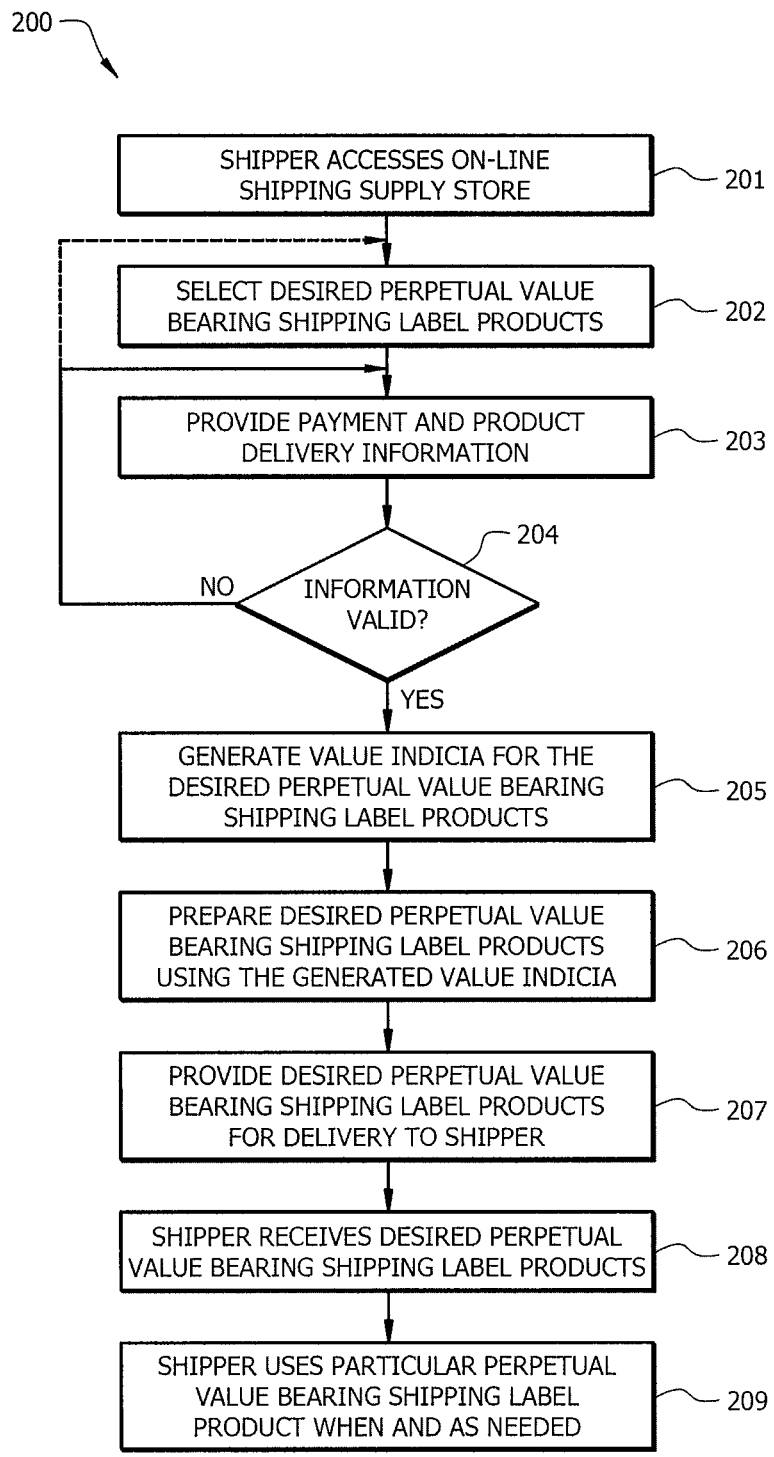
FIG. 2 shows a flow diagram of operation of the system of FIG. 1 to provide perpetual value bearing shipping label product on-line fulfillment according to embodiments herein.

Having described system 100 adapted to provide perpetual value bearing shipping labels according to embodiments of the invention, attention is directed to FIG. 2 showing a flow diagram of operation of system 100 as an on-line fulfillment system. Specifically, flow 200 of FIG. 2 provides cooperative operation of order processing system 110, value indicia generation system 120, fulfillment system 130, and user terminal 170 of FIG. 1 to provide an on-line fulfillment system in which shippers may select a desired number of perpetual value bearing shipping labels in one or more value bearing amount for purchase by and delivery to the shipper for later use. Accordingly, elements of embodiments of such an on-line fulfillment system may be implemented code segments (e.g., software and/or firmware) operable upon one or more processor-based systems (e.g., order processing system 110, value indicia generation system 120, fulfillment system 130, and/or user terminal 170), to perform the tasks described herein. The code segments can be stored in a computer readable medium, such as may comprise RAM, ROM, flash memory, disk memory, optical memory, cryptographically protected memory, and/or the like. Additionally or alternatively, the code segments may be downloaded via computer networks, such as network 190.

At block 201 of the illustrated embodiment of flow 200 a shipper accesses an on-line commerce site where perpetual value bearing shipping label products herein are made available for selection and purchase. For example, shipper 101 may utilize a web browser executing upon user terminal 170 to navigate to and interface with (e.g., via network 190) a web based store application (e.g., on-line shipping supply store) provided by order processing system 110.

At block 202 of the illustrated embodiment, the shipper selects one or more desired perpetual value bearing shipping label product available through the on-line commerce site. For example, shipper 101 may select a first number of flat rate envelopes, a second number of small flat rate shipping containers, a third number of medium flat rate shipping containers, and/or a fourth number of large flat rate shipping containers, each having perpetual value bearing shipping labels of appropriate value attached thereto, for purchase using a user interface of user terminal 170. According to embodiments of the invention, perpetual value bearing shipping label products made available for purchase may comprise a plurality of perpetual value bearing shipping labels (e.g., provided in bundles of predetermined numbers and/or combinations).

Payment and product delivery information is provided in order to complete the order at block 203 of the illustrated embodiment. For example, payment information in the form of a credit or debit card account, checking account number or electronic check information, electronic currency data, prepaid or postpaid account information, etc., may be used by system 100 in collecting payment for the desired perpetual value bearing shipping label products. Product delivery information in the form of a business or residential address, post office box, mail stop, etc., may be used by system in delivering the purchased perpetual value bearing shipping label products to the shipper.

The shipper may, for example, have an account with a service provider providing the perpetual value bearing shipping label products, or otherwise associated therewith, (e.g., a PC based postage on demand service provider providing generation of the perpetual value based shipping label value indicia) and thus may have previously provided some or all of the foregoing payment and product delivery information. On-line fulfillment system operation according to embodiments herein may utilize this information at block 203. Shippers which otherwise do not have an account (e.g., an on-line PC based postage on demand metering account) or which have not otherwise provided some or all of the foregoing payment and product delivery information may nevertheless purchase and use perpetual value bearing shipping labels using embodiments of the invention. For example, on-line fulfillment system operation according to embodiments of the invention may solicit such information from the shipper and/or derive such information from information provided by the shipper. Such information may be stored by one or more system of system 100 for later use in subsequent perpetual value bearing shipping label product purchase transactions, thereby providing a shipper registration process.

A shipping service provider with which the purchased perpetual value bearing shipping label products are to be used may have various information requirements, such as a known shipper information requirement. For example, product delivery information and/or payment information (e.g., purchaser identification and/or address information included in or derived from the payment information) may be used as information to satisfy a known shipper information requirement. Accordingly, the product delivery information and/or payment information may be validated to confirm that the information is satisfactory to meet information requirements of a shipping service provider or other entity. At block 204, the product delivery information and/or payment information may be validated to confirm that, for the particular perpetual value bearing shipping label products selected by the shipper for purchase, the information is sufficient and acceptable (e.g., a complete address, a physical address, not a mail drop or post office box, etc.). Embodiments may analyze the information itself, compare the information to other data sources (e.g., an address database), compare the information to itself (e.g., compare product delivery address information to address information associated with the payment information for consistency), and/or the like. The product delivery information and/or payment information may thus be validated at block 204 and, if the product delivery information and/or payment information is found not to be valid or otherwise insufficient to meet one or more information requirement for the particular perpetual value bearing shipping label products to be purchased, remedial processing may be performed. For example, processing may return to block 203 for obtaining valid product delivery and/or payment information. Alternatively, processing may return to block 202 for reselection of perpetual value bearing shipping label products, such as to include only perpetual value bearing shipping label products for which the product delivery and/or payment information is valid or which the information otherwise meets the information requirements associated therewith (e.g., perpetual value bearing shipping label products having no known shipper information requirements).

It should be appreciated that the perpetual value bearing shipping label products to be acquired using the on-line fulfillment system operation of flow 200 bear value. Accordingly, embodiments of the invention operate to confirm that the aforementioned payment information is valid. For example, the payment information may be validated to confirm that payment in the appropriate amount (e.g., in an amount sufficient to meet the value of perpetual value bearing shipping label products ordered, service charges associated with the purchase of perpetual value bearing shipping label products by the shipper, delivery charges associated with the delivery of the perpetual value bearing shipping label products to the shipper, and/or the like) is available to or has been received by order processing system 110 or systems in communication therewith.

In operation according to embodiments of the invention, payment information validation performed by order processing system 110 may include collection or other reservation of the funds for the perpetual value bearing shipping label product purchase transaction. For example, where a credit or debit card is used by a shipper to purchase perpetual value bearing shipping label products, payment processing functions of order processing system 110 may perform a transaction to charge that card for an amount appropriate to the purchase being made. If such a transaction were to fail, validation of the payment information at block 204 may fail according to embodiments of the invention.

Embodiments of the invention implement payment processing in performing transactions to charge a shipper for the purchase of perpetual value bearing shipping label products in a non-traditional manner. For example, rather than applying the payment to a merchant account associated with the commerce site conducting the transaction, the payment is applied to postage value used in generation of value indicia for the perpetual value bearing shipping label products being purchased according to embodiments. In operation according to an embodiment, the payment information (e.g., credit card number) is used to purchase postage value on a postage meter system (e.g., a PC based postage meter system implemented by value indicia generation system 120), such as using a postage security device (PSD), or "vault", shared among purchasers of perpetual value bearing shipping label products. Accordingly, a postage value credit type transaction, perhaps including basic postage purchase checks and other operations, (see, for example, aforementioned U.S. Pat. Nos. 5,510,992 and 5,822,739 for details with respect to postage value credit transactions) is performed with respect to the payment information by embodiments of the invention. Thus, rather than depositing funds from a payment processing transaction in a merchant account, operation of order processing system 110 of embodiments may deposit the funds with a shipping service provider (e.g., in a bank account of the USPS) and initiate a value credit transaction with respect to a vault to be used in value indicia generation. Such embodiments essentially substitute the shipper payment mechanism for a postage value purchase mechanism. It should be appreciated, however, that other payment processing techniques may be implemented according to alternative embodiments of the invention.

Non-traditional payment processing provided according to embodiments of the invention may forego the aforementioned vault value credit operation. For example, the payment may be applied to an account of a shipping service provider and thereafter value indicia generation allowed to be performed without a vault (e.g., PSD) having been provided corresponding credit. Such embodiments may utilize a "negative balance" vault, wherein a traditional descending register (e.g., replenishable value balance register) is not used. Likewise, such embodiments may utilize a batch funded vault, wherein bulk value is available for use prior to or without the aforementioned vault value credit operation.

Payment information validation at block 204 may thus operate to perform appropriate payment processing in addition to or in the alternative to confirming that, for the particular perpetual value bearing shipping label products selected by the shipper for purchase, the information is sufficient and acceptable. If such payment processing fails (and thus the payment information is found valid), remedial processing may be performed. For example, processing may return to block 203 for obtaining valid payment information. Alternatively, processing may return to block 202 for reselection of perpetual value bearing shipping label products, such as to reduce a total value thereof to meet an amount available using the payment information.

Where the payment information is determined to be valid at block 204 of the illustrated embodiment, further processing to fulfill the order may be initiated. For example, when it is determined that any shipper information required by a shipping service provider for the particular perpetual value bearing shipping label products has been provided and that payment for the perpetual value bearing shipping label products (perhaps including additional fees for the on-line commerce service, processing, delivery, etc.) the shipper may be notified that the order has been successfully placed and processing according to the illustrated embodiment proceeds to block 205 for generation of value indicia for the perpetual value bearing shipping label products being purchased.

At block 205 of the illustrated embodiment value indicia (e.g., secure data packet 142) used in providing the perpetual value bearing shipping labels are generated. For example, order processing system 110 may provide appropriate information (e.g., shipper information, selected perpetual value bearing shipping label product information including product number and value information, etc.) to value indicia generation system 120, such as via network 190, for use in generating value indicia. Value indicia generation system 120 may then operate to generate value indicia (e.g., generate secure data packets, such as may form IBI and/or other secure data packets) which may be included on or in perpetual value bearing shipping labels of the purchased value bearing shipping label products. In operation according to embodiments of the invention, the shipper information is associated with the generated value indicia (or perpetual value bearing shipping label thereof), such as for meeting a known shipper requirement of a shipping service provider. For example, shipper information may be included in the generated value indicia, the perpetual value bearing shipping label, and/or records associated therewith (e.g., reporting and/or and audit information, such as the vendor logs utilized by the USPS, provided by the metering system used to generate value indicia for perpetual value bearing shipping labels).

Additional or alternative information may be associated with or included in the generated value indicia and/or perpetual value bearing shipping labels of embodiments. For example, unique information of the particular label stock upon which the individual value indicia and perpetual value bearing shipping label thereof are to be printed (e.g., for use in validating perpetual value bearing shipping labels herein) may be included within the value indicia and/or other portions of the perpetual value bearing shipping label. This information may be communicated to fulfillment system 130, such as either with or separate from the generated value indicia, for facilitating printing of perpetual value bearing shipping labels on the proper individual label stock.

Likewise, information may be generated by value indicia generation system 120 in addition to the value indicia. For example, delivery confirmation or tracking information may be generated in association with generated value indicia. Because the delivery address is unknown at the time of generation of the value indicia according to embodiments, such delivery confirmation or tracking information may be adapted for use with perpetual value bearing shipping labels herein. For example, destination address information typically found in such delivery confirmation or tracking information (e.g., destination ZIP code information) may be omitted or replaced with dummy or null information according to embodiments.

Various forms of metering systems may be utilized in generating value indicia for perpetual value bearing shipping labels according to embodiments of the invention. For example, metering systems providing on-demand metering operations such as shown and described in aforementioned U.S. Pat. Nos. 5,510,992 and 5,822,739 may be adapted to be utilized according to embodiments herein. Embodiments of the invention may additionally or alternatively use techniques for the generation and activation of postage indicia as shown and described in the aforementioned United States patent applications entitled "Systems and Methods for Distributed Activation of Postage" and "Systems and Methods Using Mobile Communication Handsets for Providing Postage." Accordingly, in operation according to an embodiment of the invention, value indicia generation system 120 utilizes on-demand and/or pre-printed indicia metering technology to generate value indicia for use in the purchased perpetual value bearing shipping labels. For example, value indicia generation system 120 may utilize on-demand techniques to generate value indicia data packet in response to purchase of perpetual value bearing shipping label products by a shipper in combination with pre-printed indicia techniques regarding providing indicia which may be validated and/or tracked when generated prior to the delivery information for the package being known or available according to embodiments of the invention. The foregoing value indicia data packet may be utilized by fulfillment system 130 in printing perpetual value bearing shipping label 140 of the perpetual value bearing shipping label products purchased by a shipper.

Generation of value indicia according to embodiments includes preparation of at least a portion of a perpetual value based shipping label in addition to the value indicia used therein. For example, information suitable for printing a shipping label including the value indicia may be prepared in association with the generation of a value indicia according to embodiments herein. In operation according to an embodiment of the invention, information such as mail class, indicia value, return address useful in creating a shipping label is used in preparation of a perpetual value bearing shipping label herein. It should be appreciated that such information may be provided by the shipper when placing the order and/or may be derived from the particular perpetual value bearing shipping label products ordered. For example, the mail class may be derived from the fact that USPS Priority flat rate perpetual value bearing shipping label products were purchased, the indicia value may be derived from the particular size of USPS Priority flat rate perpetual value bearing shipping label products purchased, and the return address may be derived from a shipping address to which the perpetual value bearing shipping label products purchased are to be delivered to the shipper making the purchase. Such information may be provided to the metering apparatus used by value indicia generation system 120 as a part of a request for value bearing shipping label generation. For example, the foregoing information and/or additional information may be provided to metering apparatus of value indicia generation system 120 accompanied by layout information (e.g., a layout parameter for selecting a shipping label layout of the perpetual value bearing shipping label herein) to initiate generation of an appropriate shipping label data packet as may be utilized by fulfillment system 130 in printing perpetual value bearing shipping label 140 of the perpetual value bearing shipping label products purchased by a shipper.

Although adapted in some ways to provide features and functionality as described herein, embodiments of the invention are adapted to utilize the foregoing metering technology, or aspects thereof, with little or relatively minor alteration. For example, requests for generation of value indicia for the perpetual value bearing shipping labels and/or for generation of the perpetual value bearing shipping labels themselves may be provided in a format consistent with usual operation of the metering apparatus utilized, although perhaps using data unique to the generation of perpetual value bearing shipping labels herein.

In accordance with embodiments of the invention, a layout parameter unique to use in perpetual value bearing shipping label generation is used. For example, the metering apparatus utilized by value indicia generation system 120 may utilize various layout parameters in order to provide generation of a data packet including appropriately formatted value indicia (e.g., sized, shaped, encoding particular data, etc.), appropriate ancillary information (e.g., facing identification mark (FIM), destination address, return address, etc.), and/or desired layout (e.g., shipping label, envelope, meter stamp, etc.). Accordingly, one or more layout parameter unique to perpetual value bearing shipping labels herein may be utilized in a request for generation of value indicia to provide generation of a data packet having features corresponding to the particular perpetual value bearing shipping label product purchased. A perpetual value bearing shipping label layout parameter utilized according to embodiments of the invention invokes a layout generated by the metering apparatus of value indicia generation 120 which includes secure data packet 142, delivery information area 143 which is devoid of specific delivery information, and shipper information area 144 including return address information laid out in a shipping label format. Embodiments may include additional or alternative features, such as security features (e.g., micro-printing), information (e.g., postal class, value indicia amount, etc.), images (e.g., logos, photographic images, icons, etc.), and/or the like.

A perpetual value bearing shipping label layout parameter utilized according to embodiments of the invention may not only provide for inclusion of appropriate information, but may additionally or alternatively provide for the omission of certain information. For example, because the value bearing shipping labels of embodiments have a perpetual or relatively long shelf life, date information (e.g., the value indicia generation or valid date) may be omitted from the generated value indicia and/or perpetual value bearing shipping label. Accordingly, although such information may be provided to the metering apparatus (e.g., to provide data in an expected format and/or for use in purposes such as reporting and auditing), the information may be suppressed in the generated data packet in accordance with perpetual value bearing shipping label layout parameters of embodiments.

Perpetual value bearing shipping label layout parameters of embodiments of the invention may be utilized for functions in addition to perpetual value bearing shipping label layout selection. For example, particular value indicia generation functions unique to perpetual value bearing shipping label generation may be initiated in association with the inclusion of a perpetual value bearing shipping label layout parameter in a generation request. The use of a perpetual value bearing shipping label layout parameter in a generation request may initiate non-traditional metering functions, such as a negative balance value indicia generation metering operation or a value credit transaction coupled with a value indicia generation metering operation, as discussed above with respect to processing according to blocks 203 and 204. Accordingly, the use of perpetual value bearing shipping label layout parameters may be restricted, such as by making the layout parameters known only to appropriate order processing service providers, making the layout parameters operable only with appropriate order processing service provider credentials, etc.

In providing value indicia generation with little or relatively minor alteration of the operation of the metering technology used, embodiments of the invention include null or dummy data (e.g., data to fill data blocks expected by the metering apparatus but which is not actually used by the perpetual value bearing shipping labels) in the request for value indicia generation. The perpetual value bearing shipping label layout parameter described in the foregoing example provides for a delivery information area which is devoid of specific delivery information. Accordingly, although a delivery address is not needed in order to generate such a delivery information area (e.g., a series of blank lines for facilitating the later hand writing of a delivery address), dummy or null delivery address information may be provided to the metering apparatus in order to provide data in a format expected by the metering apparatus, to provide information which is utilized for purposes other than value indicia generation, etc. For example, the metering apparatus may expect particular fields of information in a predetermined order (e.g., including the aforementioned delivery address) when receiving a generation request, and thus null or dummy information may be included in the request for perpetual value bearing shipping label value indicia generation although that information is not utilized directly in the perpetual value bearing shipping label. The perpetual value bearing shipping label layout parameter may cause the null or dummy information to be omitted or replaced (e.g., a dummy delivery address may be replaced with a series of blank lines) when the value indicia is generated.

It should be appreciated that the information expected by the metering apparatus which, although not used in generation of perpetual value bearing shipping labels of embodiments, may be used for other purposes, such as reporting and auditing the generation and use of value indicia. Accordingly, rather than using null information in place of such information in the generation request, embodiments of the invention may include dummy information useful in facilitating such other purposes, while continuing to be replaced or otherwise not used in the generation of the perpetual value bearing shipping label value indicia. Thus, reporting and audit information may continue to be provided by the metering apparatus used to generate value indicia for perpetual value bearing shipping labels using such dummy information provided in a format consistent with the usual operation of the on-demand metering system (e.g., includes data fields not actually used by the perpetual value bearing shipping labels). The dummy information may comprise predetermined information useful in performing the other functions (e.g., a particular address used as the delivery address information to indicate in an audit report that the value indicia was part of a perpetual value bearing shipping label), may be accurate, although unused, information (e.g., a date of generation of the value indicia which date is not used as part of a perpetual value bearing shipping label), etc.

In operation according to embodiments of the invention, generation of value indicia as provided at block 205 provides generation of a data packet representing a complete perpetual value bearing shipping label. Such a data packet may, for example, comprise data suitable for printing perpetual value bearing shipping label 140, including secure data packet 142, delivery information area 143, and shipper information area 144, by printer 131 of fulfillment system 130. Data packets utilized according embodiments of the invention may, for example, comprise a digital image file including foregoing components embedded therein. Where security feature 145 is uniquely associated with the value indicia (e.g., secure data packet 142) and/or some other portion of the perpetual value bearing shipping label, the appropriate one of label stock 141 having the correct security feature thereon may be selected for printing the perpetual value bearing shipping label by printer 131. For example, value indicia generation system 120 may provide information regarding the particular label stock to be used (e.g., starting serial number of security feature 145) in printing the perpetual value bearing shipping labels.

The data packets generated by value indicia generation system 120 at block 205 may be made available for use by fulfillment system 130 in a number of ways. For example, data packets generated for one or more orders of perpetual value bearing shipping label products may be communicated from value indicia generation system 120 to fulfillment system 130 via network 190. Such communication may be initiated by value indicia generation system 120, such as upon completion of generation of one or more data packets (e.g., the data packets of one or more shipper's orders), periodically (e.g., once an hour, day, etc.), upon the occurrence of an event (e.g., upon generation of a predetermined number of data packets, upon generation of the data packets for a shipper's order, etc.), and/or the like. Such communication may additionally or alternatively be initiated by fulfillment system 130, such as upon occurrence of an event (e.g., upon initiation of fulfillment processing, upon completion of fulfillment processing of a previous order, etc.), periodically (e.g., once an hour, day, etc.), and/or the like. In operation according to embodiments of the invention, value indicia generation system 120 stores one or more (e.g., those of a single order and/or same type) generated perpetual value bearing shipping label data packet in a location accessible by a unique uniform resource locater (URL), whereby providing the URL to fulfillment system 130 provides access to the associated one or more perpetual value bearing shipping label data packet.

At block 206 of the illustrated embodiment of flow 200, the purchased perpetual value bearing shipping label products are prepared. For example, perpetual value bearing shipping label data packets generated by value indicia generation system 120 may be used by fulfillment system 130 to print perpetual value bearing shipping labels 140 upon label stock 141 by printer 131. Although a single fulfillment system is illustrated in the embodiment of FIG. 1, it should be appreciated that a plurality of such fulfillment systems may be provided, such as may be located at different geographic locations. Accordingly, a particular fulfillment system (e.g., a fulfillment system located most near a location to which the purchased perpetual value bearing shipping label products are to be delivered, a fulfillment system having resources adapted for providing the particular perpetual value bearing shipping label products ordered by the shipper, a fulfillment system having capacity available for processing the purchased perpetual value bearing shipping label products, etc.) may be selected for use at block 206 of embodiments.

Where the aforementioned URLs are utilized with respect to the generated perpetual value bearing shipping labels, fulfillment system 130 may access the appropriate URL, obtain the perpetual value bearing shipping label data packet, and cause printer 131 to print the perpetual value bearing shipping label image, comprising secure data packet 142, delivery information area 143 which is devoid of specific delivery information, and shipper information area 144 including return address information laid out in a shipping label format, upon label stock 141 to thereby form perpetual value bearing shipping label 140. Alternatively, fulfillment system 130 may receive the perpetual value bearing shipping label data packet in a communication from value indicia generation system 120 or another system, may solicit the perpetual value bearing shipping label data packet from value indicia generation system 120 or another system, etc.

Perpetual value bearing shipping labels 140 are preferably affixed to an appropriate one of shipping containers 151 to thereby provide perpetual value bearing shipping label products 150. For example, perpetual value bearing shipping labels may be affixed to corresponding flat rate shipping containers having a flat shipping rate corresponding to the value borne by the perpetual value bearing shipping label. The various perpetual value bearing shipping label products of a particular shipper's order may be packaged or otherwise bundled together for delivery to the shipper. Such affixing of perpetual value bearing shipping labels to corresponding shipping containers and/or bundling of the perpetual value bearing shipping label products of a shipper's order may be performed manually (e.g., by personnel associated with a fulfillment service) or through automated means (e.g., by package processing apparatus of fulfillment system 130).

The purchased perpetual value bearing shipping label products ordered are provided to the shipper at block 207 of the illustrated embodiment. For example, a package of perpetual value bearing shipping label products comprising the order of a shipper may be provided to delivery service 160 for delivery to shipper 101 at an address provided by the shipper when placing the order using order processing system 110.

At block 208, the shipper receives the purchased perpetual value bearing shipping label products, such as from shipping service 160, and may thereafter use the perpetual value bearing shipping label products for shipping items when and as needed at block 209. For example, as shipper 101 is later performing, a shipping activity (e.g., shipping a particular item of items 102 to an intended recipient), the shipper may select any appropriately sized flat rate shipping container having a perpetual value bearing shipping label affixed thereto for use in shipping a package to a destination address of the intended recipient. The shipper may complete the perpetual value bearing shipping label, such as through the addition of destination address information thereto, for use of the perpetual value bearing shipping label product. Such selection and use of the perpetual value bearing shipping label products may be well after a time at which the perpetual value bearing shipping label was generated, and even after an increase in the flat shipping rate associated with the flat rate shipping container has increased.

Figure 3:
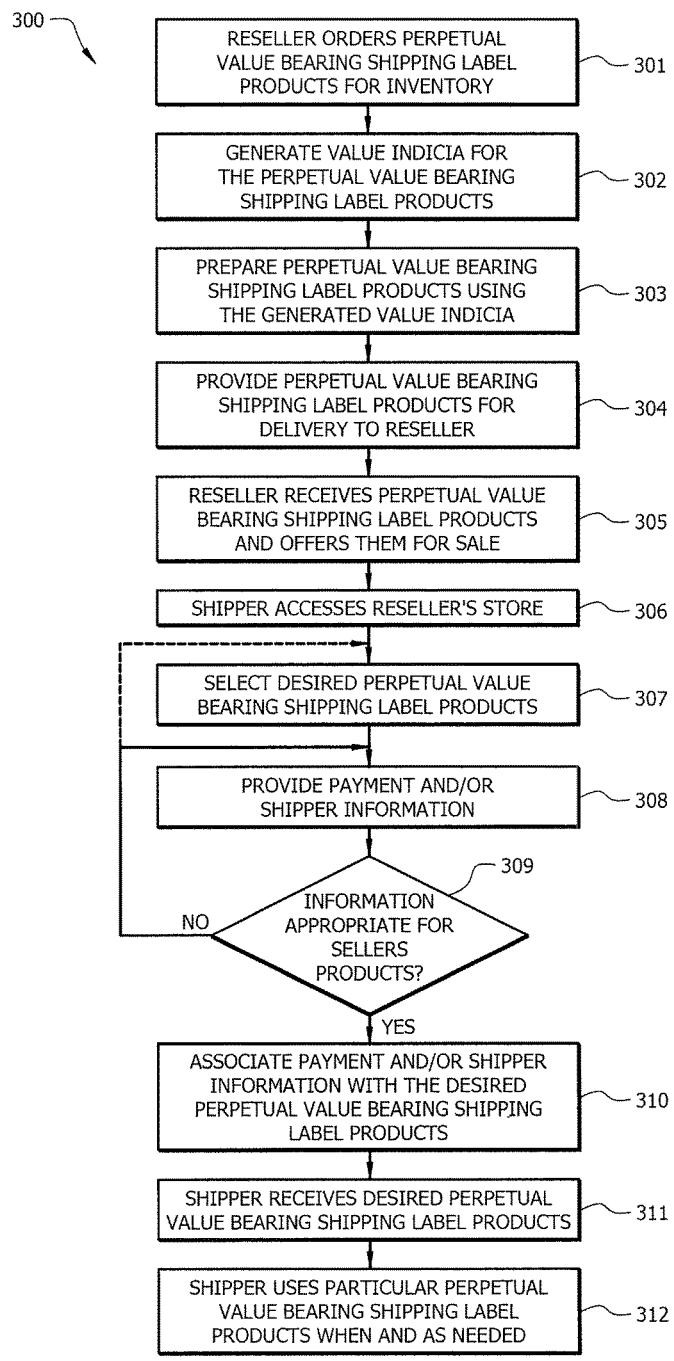
FIG. 3 shows a flow diagram of operation of the system of FIG. 1 to provide perpetual value bearing shipping label product point of sale acquisition according to embodiments herein.

FIG. 3 shows a flow diagram of operation of system 100 in an alternative embodiment to the on-line fulfillment system of FIG. 2. Specifically, flow 300 of FIG. 3 provides cooperative operation of order processing system 110, value indicia generation system 120, and fulfillment system 130 of FIG. 1 to provide a point of sale acquisition system in which shippers may select a desired number of perpetual value bearing shipping labels in one or more value bearing amount for purchase by the shipper for later use at a point of sale of reseller 180. Accordingly, elements of embodiments of such a point of sale acquisition system may be implemented code segments (e.g., software and/or firmware) operable upon one or more processor-based systems (e.g., order processing system 110, value indicia generation system 120, fulfillment system 130, and/or user terminal 170), to perform the tasks described herein. The code segments can be stored in a computer readable medium, such as may comprise RAM, ROM, flash memory, disk memory, optical memory, cryptographically protected memory, and/or the like. Additionally or alternatively, the code segments may be downloaded via computer networks, such as network 190.

Various numbers of flat rate envelopes, small flat rate shipping containers, medium flat rate shipping containers, and/or large flat rate shipping containers, each having perpetual value bearing shipping labels of appropriate value attached thereto, may be stocked at a retail location for selection and purchase by shippers. Accordingly, at block 301 of the illustrated embodiment the reseller orders perpetual value bearing shipping label products for inventory. For example, personnel of reseller 18 may accesses an on-line commerce site, substantially as discussed above with respect to the on-line fulfillment system of FIG. 2, where perpetual value bearing shipping label products herein are made available. Accordingly, such personnel may utilize a web browser executing upon user terminal 170 to navigate to and interface with (e.g., via network 190) a web based store application (e.g., on-line shipping supply store) provided by order processing system 110. Of course, the reseller may use alternative means of placing an order for perpetual value bearing shipping label products, such as telephone ordering, purchase order based ordering, etc.

At block 302 of the illustrated embodiment value indicia used in providing the perpetual value bearing shipping labels are generated. Generation of the value indicia may be provided substantially as described above with respect to the on-line fulfillment system of FIG. 2. For example, perpetual value bearing shipping labels provided for point of sale acquisition according to an embodiment of the invention are generated by on-demand metering technology. Accordingly, order processing system 110 as may be utilized by or on behalf of the reseller may provide appropriate information (e.g., reseller information, selected perpetual value bearing shipping label product information including product number and value information, etc.) to value indicia generation system 120, such as via network 190, for use in generating value indicia. Value indicia generation system 120 may then operate to generate value indicia (e.g., generate secure data packets, such as may form IBI and/or other secure data packets) which may be included on or in perpetual value bearing shipping labels of the ordered value bearing shipping label products.

Generation of value indicia according to embodiments includes preparation of at least a portion of a perpetual value based shipping label in addition to the value indicia used therein. For example, information suitable for printing a shipping label including the value indicia may be prepared in association with the generation of a value indicia according to embodiments herein. However, because generation of the perpetual value based shipping label is performed for providing perpetual value based shipping label products for reseller inventory, the shipper who will ultimately utilize the product is unlikely to be known. Accordingly, shipper information as may be used for return address information in the perpetual value bearing shipping labels to be generated may not be present.

As discussed above with respect to the on-line fulfillment system embodiment, in providing value indicia generation with little or relatively minor alteration of the operation of the metering technology used, embodiments of the invention include null or dummy data (e.g., data to fill data blocks expected by the metering apparatus but which is not actually used by the perpetual value bearing shipping labels) in the request for value indicia generation. A perpetual value bearing shipping label layout parameter may provide for both a delivery information area and a shipper information area which are devoid of specific delivery information. Accordingly, although a delivery address and a return address is not needed in order to generate such information areas (e.g., a series of blank lines for facilitating the later hand writing of a delivery address and a return address), dummy or null delivery address information may be provided to the metering apparatus in order to provide data in a format expected by the metering apparatus, to provide information which is utilized for purposes other than value indicia generation, etc. Embodiments of the invention may include dummy information useful in facilitating particular purposes, while continuing to be replaced or otherwise not used in the generation of the perpetual value bearing shipping label value indicia. The dummy information may comprise predetermined information useful in performing the other functions (e.g., a particular address used as the delivery address information and/or shipper information to indicate in an audit report that the value indicia was part of a perpetual value bearing shipping label), may comprise accurate although information not used directly in the generated value indicia (e.g., a date of generation of the value indicia which date is not used as part of a perpetual value bearing shipping label, the particular reseller/reseller location for which the perpetual value bearing shipping label products were generated, etc.), and/or the like.

In operation according to embodiments of the invention, generation of value indicia as provided at block 302 provides generation of a data packet representing a complete perpetual value bearing shipping label. Such a data packet may, for example, comprise data suitable for printing perpetual value bearing shipping label 140, including secure data packet 142, delivery information area 143, and shipper information area 144, by printer 131 of fulfillment system 130. Data packets utilized according embodiments of the invention may, for example, comprise a digital image file including foregoing components embedded therein. Such data packets generated by value indicia generation system 120 at block 302 may be made available for use by fulfillment system 130 in a number of ways, as discussed above.

At block 303 of the illustrated embodiment of flow 300, the ordered perpetual value bearing shipping label products are prepared. For example, perpetual value bearing shipping label data packets generated by value indicia generation system 120 may be used by fulfillment system 130 to print perpetual value bearing shipping labels 140 upon label stock 141 by printer 131. Perpetual value bearing shipping labels 140 are preferably affixed to an appropriate one of shipping containers 151 to thereby provide perpetual value bearing shipping label products 150. The various perpetual value bearing shipping label products of a particular reseller's order may be packaged or otherwise bundled together for delivery to the reseller. Such affixing of perpetual value bearing shipping labels to corresponding shipping containers and/or bundling of the perpetual value bearing shipping label products of a reseller's order may be performed manually (e.g., by personnel associated with a fulfillment service) or through automated means (e.g., by package processing apparatus of fulfillment system 130).

The ordered perpetual value bearing shipping label products are provided to the reseller at block 304 of the illustrated embodiment. For example, a package of perpetual value bearing shipping label products comprising the order of a reseller may be provided to delivery service 160 for delivery to reseller 180 at an address provided by the reseller when placing the order using order processing system 110.

At block 305, the reseller receives the ordered perpetual value bearing shipping label products, such as from shipping service 160, and may thereafter offer the perpetual value bearing shipping label products for purchase by shippers, such as shipper 101. Accordingly, at block 306 of the illustrated embodiment a shipper accesses the reseller's location where the perpetual value bearing shipping label products are made available for selection and purchase.

At block 307 of the illustrated embodiment, the shipper selects one or more desired perpetual value bearing shipping label product offered by the reseller. For example, shipper 101 may select a first number of flat rate envelopes, a second number of small flat rate shipping containers, a third number of medium flat rate shipping containers, and/or a fourth number of large flat rate shipping containers, each having perpetual value bearing shipping labels of appropriate value attached thereto, for purchase at a point of sale of reseller 180. According to embodiments of the invention, perpetual value bearing shipping label products made available for purchase may comprise a plurality of perpetual value bearing shipping labels (e.g., provided in bundles of predetermined numbers and/or combinations).

Payment information is provided in order to complete the purchase of the perpetual value bearing shipping label products by a shipper at block 306 of the illustrated embodiment. For example, payment information in the form of a credit or debit card account, checking account, electronic currency data, prepaid or postpaid account information, etc., may be used by the reseller in collecting payment for the desired perpetual value bearing shipping label products.

As discussed above, a shipping service provider with which the purchased perpetual value bearing shipping label products are to be used may have various information requirements, such as a known shipper information requirement. Accordingly, shipper information may be collected for providing information satisfactory for the known shipper information at the time of purchasing the perpetual value bearing shipping label products by the shipper. That is, because the perpetual value bearing shipping label products offered by reseller 180 may have been generated as "generic" stock (e.g., available for use by any shipper), shipper information may not have been associated with the perpetual value bearing shipping labels when generated and thus such information may be collected at the point of sale for association with the particular products purchased. For example, payment information (e.g., purchaser identification and/or address information included in or derived from the payment information) may be used as information to satisfy a known shipper information requirement.

The shipper may, for example, have an account with the reseller offering the perpetual value bearing shipping label products for sale and thus may have previously provided some or all of the foregoing shipper information. For example, the shipper may have a traditional customer account with the reseller, such as for facilitating post-paid purchases, and thus may have provided credit information (e.g., name, address, bank account information, business affiliation, etc.). Additionally or alternatively, the reseller may be a membership type reseller (e.g., SAM'S CLUB, COSTCO WHOLESALE, BJ'S WHOLESALE CLUB, PACE WHOLESALE CLUB, MAKRO, PRICESMART, etc.) whereby purchasers must hold a membership and thus provide membership information (e.g., name, address, business affiliation, credit account information, etc.) to join and present membership credentials when making purchases. Similarly, the reseller may be a reseller that offers a loyalty or rewards program in which membership is maintained (e.g., SAFEWAY REWARDS, KROGER PLUS CARD, WALGREENS REWARDS, OFFICE DEPOT WORKLIFE REWARDS, etc.) whereby purchasers register for the program and provide membership information (e.g., name, address, etc.) to join and present program credentials when making purchases in order to receive the rewards. Reseller 180 may utilize any or all such sources of information at block 307 for obtaining shipper information.

Shippers which otherwise do not have a reseller account or membership (e.g., reseller credit account, reseller membership, reseller rewards program membership, etc.) may nevertheless purchase and use perpetual value bearing shipping labels using embodiments of the invention. For example, reseller 180 may solicit such information from the shipper and/or derive such information from information provided by the shipper.

The shipper information may be validated to confirm that the information is satisfactory to meet information requirements of a shipping service provider or other entity. At block 309, the shipper information may be validated to confirm that, for the particular perpetual value bearing shipping label products selected by the shipper for purchase, the information is sufficient and acceptable (e.g., a complete address, a physical address, not a mail drop or post office box, etc.). Embodiments may analyze the information itself, compare the information to other data sources (e.g., an address database), compare the information to itself (e.g., compare membership address information to address information associated with the payment information for consistency), and/or the like. The shipper information may thus be validated at block 309 and, if the shipper information is found not to be valid or otherwise insufficient to meet one or more information requirement for the particular perpetual value bearing shipping label products to be purchased, remedial processing may be performed. For example, processing may return to block 308 for obtaining valid shipper information. Alternatively, processing may return to block 307 for reselection of perpetual value bearing shipping label products, such as to include only perpetual value bearing shipping label products for which the shipper information is valid or which the information otherwise meets the information requirements associated therewith (e.g., perpetual value bearing shipping label products having no known shipper information requirements).

Embodiments of the invention may operate to validate information other than shipper information when determining if information appropriate for the selected perpetual value bearing shipping label products is present at block 309. For example, where reseller 180 collects satisfactory information regarding purchasers (e.g., collects and stores information regarding the identity of a purchaser from their payment information, membership card, reward card, biometric sensors, etc.), the determination of whether information appropriate for the products being purchased has been collected at block 309 may operate to determined by identifying or otherwise analyzing the reseller.

The perpetual value bearing shipping label products to be acquired using the point of sale acquisition system operation of flow 300 bear value. Accordingly, embodiments of the invention operate to confirm that the payment made by the shipper is valid substantially as discussed above with respect to the on-line fulfillment embodiment of FIG. 2. For example, the payment information may be validated to confirm that payment in the appropriate amount (e.g., in an amount sufficient to meet the value of perpetual value bearing shipping label products ordered, service charges associated with the purchase of perpetual value bearing shipping label products by the shipper, and/or the like) is available to or has been received by reseller 180. If a payment transaction were to fail, validation of the payment information at block 309 may fail according to embodiments of the invention. It should be appreciated, however, that payment for the value of the perpetual value bearing shipping label products has previously been made by the reseller according to embodiments of the invention. Thus, validation of payment may be immaterial to the point of sale acquisition flow from the perspective of the shipping service provider associated with the perpetual value bearing shipping label products being purchased.

Irrespective of how the shipper information was obtained (e.g., derived from payment information, obtained from reseller account/membership information, solicited directly from the shipper at point of sale, etc.), such information may be stored by one or more system of system 100 in association with the particular perpetual value bearing shipping label products purchased at block 310 of the illustrated embodiment. For example, in operation according to embodiments of the invention, the shipper information is associated with the generated value indicia (or perpetual value bearing shipping label thereof), such as for meeting a known shipper requirement of a shipping service provider. Shipper information may be provided to value indicia generation system 120 by reseller 180 for storage in association with the generated value indicia, the perpetual value bearing shipping label, and/or records associated therewith (e.g., reporting and/or and audit information provided by the metering system used to generate value indicia for perpetual value bearing shipping labels). For example, reseller 180 may use point of sale equipment (e.g., optical scanner) to scan the value indicia (e.g., secure data packet 142), delivery confirmation or tracking information on or associated with the perpetual value bearing shipping label products being purchased, etc., for use in associating the shipper information with the particular perpetual value bearing shipping labels being purchased.

Such purchase and association of shipper information may operate to activate the purchased perpetual value bearing shipping labels for use in shipping items. For example, techniques for activation of pre-printed indicia as shown and described in the above referenced United States patent applications entitled "Systems and Methods for Distributed Activation of Postage" and "Systems and Methods Using Mobile Communication Handsets for Providing Postage" may be utilized according to embodiments of the invention.

In embodiments where the reseller is relied upon to collect and store satisfactory information regarding purchasers, information regarding the reseller (e.g., reseller identification information) may be stored in association with the particular perpetual value bearing shipping label products purchased at block 310. Such information may be relied upon to provide known seller information, for example, through identifying the particular reseller associated with a perpetual value bearing shipping label in question and then analyzing that reseller's records to determine a particular shipper or a relatively small pool of shippers (e.g., all persons having purchased perpetual value bearing shipping label products from the reseller within a particular time frame).

Where it is not required or desired to associate shipper information with the particular perpetual value bearing shipping label products purchased, embodiments of the invention may omit processing according to block 310 of the illustrated embodiment. For example, where a shipper purchases only perpetual value bearing shipping label products comprising flat rate envelopes having no known shipper requirement imposed by the shipping service provider, association of shipper information with the purchased perpetual value bearing shipping labels may be omitted, if desired.

At block 311, the shipper receives the purchased perpetual value bearing shipping label products, such as from personnel of reseller 180, and may thereafter use the perpetual value bearing shipping label products for shipping items when and as needed at block 312. For example, as shipper 101 is later performing a shipping activity (e.g., shipping a particular item of items 102 to an intended recipient), the shipper may select any appropriately sized flat rate shipping container having a perpetual value bearing shipping label affixed thereto for use in shipping a package to a destination address of the intended recipient. The shipper may complete the perpetual value bearing shipping label, such as through the addition of return address information and destination address information thereto, for use of the perpetual value bearing shipping label product. Such selection and use of the perpetual value bearing shipping label products may be well after a time at which the perpetual value bearing shipping label was generated, and even after an increase in the flat shipping rate associated with the flat rate shipping container has increased.

It should be appreciated that the foregoing on-line fulfillment system and point of sale acquisition embodiments for providing perpetual value bearing shipping labels are merely exemplary of the application of the concepts herein. Accordingly, various other embodiments for generating, acquiring, and using perpetual value bearing shipping labels in accordance with the concepts of the present invention may be realized.

For example, concepts of perpetual value bearing shipping labels herein may be implemented with respect to on-demand metering users. According to one such embodiment, shippers having an on-demand metering account, such as for generating and printing IBI based postage indicia, may be enabled to generate the perpetual value bearing shipping labels, such as using their on-demand metering account via value indicia generation system 120, and printing a perpetual value bearing shipping label including the value indicia using a local printer, such as a printer (not shown) coupled to user terminal 170. A perpetual value bearing shipping label parameter, as discussed above, may be made available for use with respect to such on-demand metering users. Embodiments may utilize special label stock, such as label stock 141, bearing security or other features, such as security feature 145, as may be sold or otherwise provided to shippers desirous of printing their own perpetual value bearing shipping labels.

Embodiments of the invention may be adapted to provide for delivery address information in a perpetual value based shipping label, and thus provide features such as address cleansing, automated printing of the address within the perpetual value bearing shipping label, etc. For example, a hybrid configuration of a perpetual value bearing shipping label acquisition system is adapted to allow a shipper to purchase (e.g., using user terminal 170 and order processing system 110) a number of perpetual value bearing shipping labels in advance and to print any or all of the pre-purchased perpetual value bearing shipping labels on demand, as needed (even after shipping rates have changed). In operation according to some such hybrid embodiments, value indicia for the pre-purchased perpetual value bearing shipping labels are generated (e.g., by value indicia generation system 120) at or near the time of pre-purchase by the shipper. However, rather than fulfilling the order by printing perpetual value bearing shipping labels including the generated value indicia, the value indicia is stored for on-demand printing of the perpetual value bearing shipping labels. As the shipper has a shipping need, the shipper may initiate printing of one or more perpetual value bearing shipping label (e.g., using user terminal 170 and a local printer (not shown) or fulfillment system 130). Because the perpetual value bearing shipping label is generated on-demand, the shipper may know the destination address and thus provide the address for inclusion in the perpetual value bearing shipping label. Processing, such as address cleansing, may thus be performed with respect to the destination address. Moreover, information associated with or included in the perpetual value bearing shipping label may be updated or replaced with more current or more complete information. For example, shipper information may be updated to reflect more current information. Likewise, a portion of the delivery confirmation or tracking information, as may have been generated at the time of value indicia generation, may be revised to include destination address information (e.g., destination ZIP code information) in place of dummy or null information initially included therein.

It should be appreciated that although embodiments have been described with reference to providing perpetual value bearing shipping label products comprising shipping containers bearing perpetual value bearing shipping labels thereon to shippers, embodiments may provide different configurations of perpetual value bearing shipping label products. For example, perpetual value bearing shipping label products comprising only the perpetual value bearing shipping labels herein may be provided according to embodiments of the invention.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A system comprising:
    a value indicia generation system comprised of one or more processor-based systems and having value indicia metering apparatus and operable to generate a data packet representing a perpetual value bearing shipping label, wherein the data packet representing the perpetual value bearing shipping label comprises null data provided in place of delivery address information by the value indicia generation system to provide data in a format expected by the value indicia metering apparatus, wherein the data packet representing the perpetual value bearing shipping label generated by the value indicia generation system comprises null data provided in place of shipper information by the value indicia generation system to provide data in a format expected by the value indicia metering apparatus, wherein the data packet representing the perpetual value bearing shipping label comprises a value indicia generated by the value indicia metering apparatus using the null data provided in place of delivery address information and the null data provided in place of shipper information, and wherein the value indicia generation system is adapted to associate later supplied shipper information with the perpetual value bearing shipping label; and
    a perpetual value bearing shipping label printed using the data packet representing the perpetual value bearing shipping label, wherein the perpetual value bearing shipping label comprises a complete prepaid value indicia printed from the value indicia generated by the value indicia metering apparatus and is viable for obtaining shipping services from a shipping service provider by a shipper beyond a shipping rate change epoch of the shipping service provider to thereby provide perpetual viability with respect to the prepaid value indicia, wherein the perpetual value bearing shipping label comprises a delivery information area which is devoid of delivery address information at a time of printing the perpetual value bearing shipping label, and wherein the perpetual value bearing shipping label comprises a shipper information area which is devoid of shipper information at the time of printing the perpetual value bearing shipping label.

2. The system of claim 1, wherein the prepaid value indicia provided by the value indicia metering apparatus is dateless.

3. The system of claim 2, wherein the perpetual value bearing shipping label is dateless.

4. The system of claim 1, further comprising:
    a fulfillment system having a printer and adapted to print the perpetual value bearing shipping label using the data packet representing the perpetual value bearing shipping label.

5. The system of claim 4, wherein the fulfillment system is adapted to provide printing of the perpetual value bearing shipping label in response to ordering of perpetual value bearing shipping label products including the perpetual value bearing shipping label by a shipper.

6. The system of claim 4, wherein the fulfillment system is adapted to provide printing of the perpetual value bearing shipping label to provide reseller stock which includes the perpetual value bearing shipping label.

7. The system of claim 1, further comprising:
    an order processing system operable to accept on-line orders of perpetual value bearing shipping label products from shippers, wherein the data packet representing the perpetual value bearing shipping label is generated in response to an on-line order for perpetual value bearing shipping label products placed by a shipper using the order processing system.

8. The system of claim 7, wherein the order processing system is adapted to determine shipper information from payment information provided by a shipper when ordering perpetual value bearing shipping products and to provide the shipper information to the value indicia generation system for including in the data packet representing the perpetual value bearing shipping label.

9. The system of claim 1, wherein the data packet representing the perpetual value bearing shipping label comprises a secure data packet representing the value indicia.

10. The system of claim 1, wherein the perpetual value bearing shipping label comprises tracking information, and wherein the value indicia generation system is adapted to provide dummy information in association with the tracking information for at least one data aspect of the tracking information.

11. The system of claim 10, wherein the at least one data aspect of the tracking information comprises delivery address information.

12. A system comprising:
    a value indicia generation system comprised of one or more processor-based systems and having value indicia metering apparatus and operable to generate a data packet representing a perpetual value bearing shipping label using one or more layout parameters unique to perpetual value bearing shipping labels to provide the data packet with particular features of the perpetual value bearing shipping label, wherein the one or more layout parameters define a delivery information area of the perpetual value bearing shipping label which is devoid of delivery address information and a shipper information area of the perpetual value bearing shipping label which is devoid of shipper address information, wherein the data packet representing the perpetual value bearing shipping label comprises null data provided in place of delivery address information in accordance with the one or more layout parameters, wherein the data packet representing the perpetual value bearing shipping label generated by the value indicia generation system comprises null data provided in place of shipper information in accordance with the one or more layout parameters, wherein the data packet representing the perpetual value bearing shipping label comprises a value indicia generated by the value indicia metering apparatus using the null data provided in place of delivery address information and the null data provided in place of shipper information, and wherein the value indicia generation system is adapted to associate later supplied shipper information with the perpetual value bearing shipping label; and a perpetual value bearing shipping label printed using the data packet representing the perpetual value bearing shipping label, wherein the perpetual value bearing shipping label comprises a complete prepaid value indicia printed from the value indicia generated by the value indicia metering apparatus and is viable for obtaining shipping services from a shipping service provider by a shipper beyond a shipping rate change epoch of the shipping service provider to thereby provide perpetual viability with respect to the prepaid value indicia, wherein the perpetual value bearing shipping label comprises a delivery information area which is devoid of delivery address information at a time of printing the perpetual value bearing shipping label, and wherein the perpetual value bearing shipping label comprises a shipper information area which is devoid of shipper information at the time of printing the perpetual value bearing shipping label.

13. The system of claim 12, wherein the value indicia generation system is operable to generate the prepaid value indicia using a value indicia generation function unique to perpetual value bearing shipping label generation in response to inclusion of the one or more layout parameters unique to perpetual value bearing shipping labels in a perpetual value bearing shipping label request.

14. The system of claim 13, wherein the value indicia generation function comprises a negative balance value indicia generation metering operation.

15. The system of claim 13, wherein the value indicia generation function comprises a value credit transaction coupled with a value indicia generation metering operation.

16. The system of claim 12, wherein the using one or more layout parameters unique to perpetual value bearing shipping labels is restricted to use only with appropriate order processing service providers.

* * * * *